United States Patent
Suwa et al.

(10) Patent No.: US 9,275,270 B2
(45) Date of Patent: Mar. 1, 2016

(54) INFORMATION PROCESSING APPARATUS AND CONTROL METHOD THEREOF

(71) Applicant: CANON KABUSHIKI KAISHA, Tokyo (JP)

(72) Inventors: Tetsuya Suwa, Yokohama (JP); Hiroyasu Kunieda, Yokohama (JP); Yusuke Hashii, Tokyo (JP); Naoki Sumi, Kawasaki (JP); Takashi Nakamura, Yokohama (JP); Takashi Fujita, Kawasaki (JP); Kiyoshi Umeda, Kawasaki (JP); Hiroyuki Sakai, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/922,802

(22) Filed: Jun. 20, 2013

(65) Prior Publication Data
US 2014/0010450 A1    Jan. 9, 2014

(30) Foreign Application Priority Data
Jul. 9, 2012    (JP) ................. 2012-154011

(51) Int. Cl.
*G06K 9/34* (2006.01)
*G06K 9/00* (2006.01)

(52) U.S. Cl.
CPC ........ *G06K 9/00268* (2013.01); *G06K 9/00281* (2013.01)

(58) Field of Classification Search
CPC .......... G06K 9/00281; G06K 9/00221; G06K 9/00268; G06K 9/00275; G06T 2207/30196; G06T 7/0081
USPC ......... 382/173, 115, 117, 118, 155, 156, 158, 382/159, 160
See application file for complete search history.

(56) References Cited

U.S. PATENT DOCUMENTS

| 5,287,439 A | 2/1994 | Koga et al. |
| 5,673,067 A | 9/1997 | Ogawa et al. |

(Continued)

FOREIGN PATENT DOCUMENTS

| JP | 05-197793 A | 8/1993 |
| JP | 06-095685 A | 4/1994 |

(Continued)

OTHER PUBLICATIONS

U.S. Appl. No. 13/921,774, filed Jun. 19, 2013, to Kunieda etal.

(Continued)

*Primary Examiner* — Manuchehr Rahmjoo
(74) *Attorney, Agent, or Firm* — Fitzpatrick, Cella, Harper & Scinto

(57) ABSTRACT

This invention provides a technique which can enhance personal recognition precision in personal recognition processing of a face in an image. To this end, a management unit classifies feature patterns each including feature information of a plurality of parts of a face region of an object extracted from image data, and manages the feature patterns using a dictionary. A segmenting unit determines whether or not feature information of each part of the face region of the object is segmented, and segments the feature information of the part of interest into a plurality of feature information as new feature information. A registration unit registers a feature pattern as a combination of the new feature information of the part of interest and feature information of parts other than the part of interest in the dictionary as a new feature pattern of the object.

24 Claims, 33 Drawing Sheets

(56) References Cited

U.S. PATENT DOCUMENTS

| | | |
|---|---|---|
| 5,677,725 A | 10/1997 | Honbo et al. |
| 6,023,716 A | 2/2000 | Fujita et al. |
| 6,065,025 A | 5/2000 | Fujita et al. |
| 6,088,137 A * | 7/2000 | Tomizawa ............... 358/538 |
| 6,608,926 B1 | 8/2003 | Suwa et al. |
| 6,694,051 B1 | 2/2004 | Yamazoe |
| 6,885,760 B2 | 4/2005 | Yamada et al. |
| 6,895,103 B2 | 5/2005 | Chen et al. |
| 6,965,684 B2 | 11/2005 | Chen et al. |
| 7,103,218 B2 | 9/2006 | Chen et al. |
| 7,167,205 B2 | 1/2007 | Ikiyama et al. |
| 7,432,985 B2 | 10/2008 | Ishikawa et al. |
| 7,738,030 B2 | 6/2010 | Akiyama et al. |
| 7,924,469 B2 | 4/2011 | Ono et al. |
| 7,944,588 B2 | 5/2011 | Yamada et al. |
| 7,983,528 B2 | 7/2011 | Sohma et al. |
| 8,175,155 B2 | 5/2012 | Suwa et al. |
| 8,184,337 B2 | 5/2012 | Sakai |
| 8,237,991 B2 | 8/2012 | Ono et al. |
| 8,401,328 B2 * | 3/2013 | Ikeda ...................... 382/274 |
| 8,405,876 B2 | 3/2013 | Nakatani et al. |
| 2001/0036298 A1 | 11/2001 | Yamada et al. |
| 2002/0081032 A1 | 6/2002 | Chen et al. |
| 2003/0016846 A1 | 1/2003 | Chen et al. |
| 2005/0063568 A1 * | 3/2005 | Sun et al. ................. 382/117 |
| 2006/0018517 A1 | 1/2006 | Chen et al. |
| 2009/0034840 A1 | 2/2009 | Umeda et al. |
| 2009/0087038 A1 * | 4/2009 | Okada et al. ............. 382/118 |
| 2010/0097642 A1 | 4/2010 | Sumi |
| 2010/0260415 A1 | 10/2010 | Sakai et al. |
| 2010/0295998 A1 | 11/2010 | Sakai et al. |
| 2011/0109923 A1 | 5/2011 | Umeda et al. |
| 2011/0158540 A1 * | 6/2011 | Suzuki et al. ............. 382/195 |
| 2011/0285871 A1 | 11/2011 | Sakai |
| 2012/0014453 A1 | 1/2012 | Kawai et al. |
| 2012/0014565 A1 | 1/2012 | Akiyama et al. |
| 2012/0268759 A1 | 10/2012 | Ono et al. |

FOREIGN PATENT DOCUMENTS

| | | |
|---|---|---|
| JP | 08-063597 A | 3/1996 |
| JP | 08-077334 A | 3/1996 |
| JP | 2541688 B | 7/1996 |
| JP | 11-053525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 2005-208850 A | 8/2005 |
| JP | 2010-251999 A | 11/2010 |
| JP | 2010-273144 A | 12/2010 |
| JP | 2011-134114 A | 7/2011 |

OTHER PUBLICATIONS

U.S. Appl. No. 13/926,499, filed Jun. 25, 2013, to Sumi et al.

* cited by examiner

FIG. 10

| SENSING LARGE CLASSIFICATION | SENSING SMALL CLASSIFICATION | DATA TYPE | VALUE |
|---|---|---|---|
| IMAGE BASIC FEATURE AMOUNT | AVERAGE LUMINANCE | int | 0~255 |
| | AVERAGE SATURATION | int | 0~255 |
| | AVERAGE HUE | int | 0~359 |
| FACE DETECTION | NUMBER OF PERSON'S FACES | int | 0~MAXFACE |
| | COORDINATE POSITION | int * 8 | 0~Width or Height |
| | AVERAGE Y IN FACE REGION | int | 0~255 |
| | AVERAGE Cb IN FACE REGION | int | -128~127 |
| | AVERAGE Cr IN FACE REGION | int | -128~127 |
| SCENE ANALYSIS | SCENE RESULT | char | Landscape Nightscape Portrait Underexposure Others |

FIG. 11

```
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
        </SensInfo>
        <UserInfo>
                <FavoriteRate>3</FavoriteRate>
                <ViewingTimes>5</ViewingTimes>
                <ImageRate>70</ImageRate>
                <PrintingTimes>3</PrintingTimes>
                <Event>Travel</Event>
        </UserInfo>
        ...
</IMAGEINFO>
```

FIG. 12

| CLASSIFICATION | CONTENTS | DATA TYPE | VALUE |
|---|---|---|---|
| IMAGE | MANUAL PREFERENCE DEGREE | int | 0~100 |
| | AUTOMATIC PREFERENCE DEGREE | int | 0~100 |
| | EVENT | char | "travel" "graduation" "wedding" |
| | | | |
| PERSON | NAME | char | "NAME" |
| | BIRTHDAY | char | YYYYMMDD |
| | RELATIONSHIP | char | "family" "" |
| | | | |

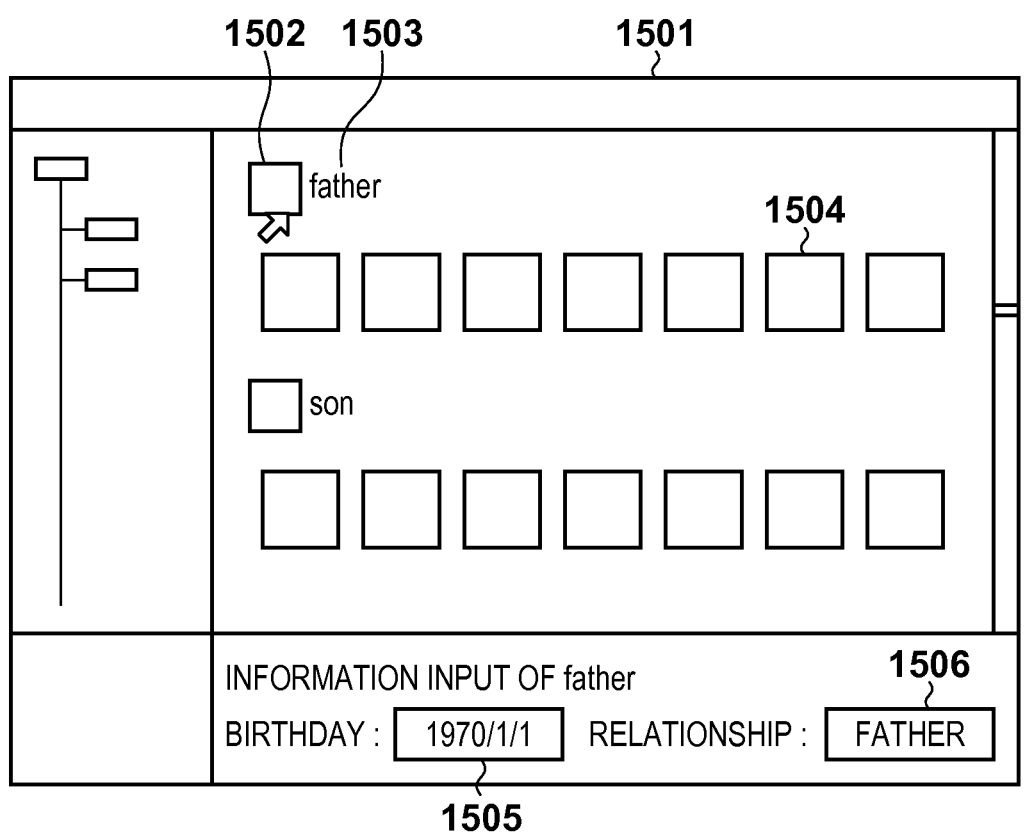
F I G. 15

F I G. 20
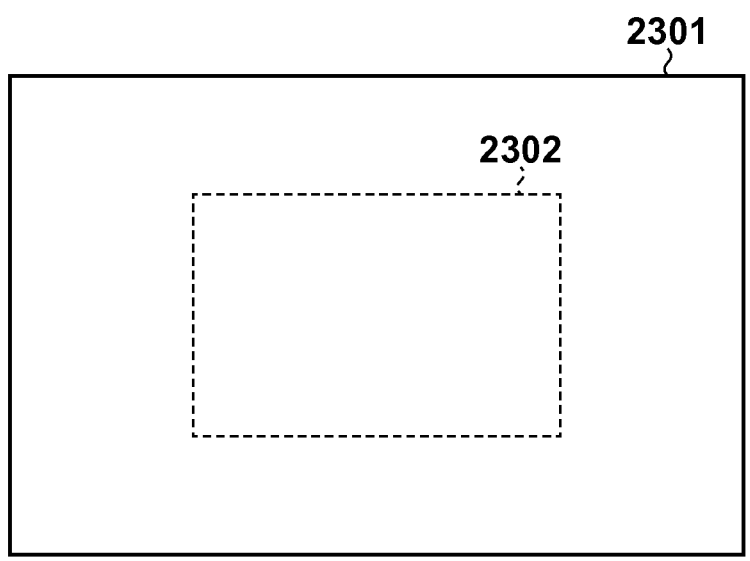

FIG. 21

| CATEGORY | CONTENTS | SCORE RANGE | THEME-DEPENDENT IMPORTANCE DEGREE (WEIGHT W) | | | |
|---|---|---|---|---|---|---|
| | | | growth | travel | favorite | ... |
| IMAGE-DEPENDENT EVALUATION | BRIGHTNESS ADEQUATE DEGREE | 0~100 | 0.5 | 1.0 | 0.0 | |
| | SATURATION ADEQUATE DEGREE | 0~100 | 0.5 | 1.0 | 0.0 | |
| IMAGE/SLOT MATCHING DEGREE EVALUATION | PERSON MATCHING DEGREE | 0~100 | 1.0 | 0.5 | 0.0 | |
| | TRIMMING OMISSION DETERMINATION | 0~100 | 1.0 | 0.5 | 0.0 | |
| INTRA-PAGE BALANCE EVALUATION | IMAGE SIMILARITY | 0~100 | 0.5 | 1.0 | 0.0 | |
| | TINCTURE VARIATION | 0~100 | 0.5 | 1.0 | 0.0 | |
| | FACE SIZE VARIATION | 0~100 | 0.5 | 1.0 | 0.0 | |
| OTHER | USER PREFERENCE | 0~100 | 0.8 | 0.8 | 1.0 | |

| IMAGE ID | CAPTURED DATE AND TIME(YYYYMMDD : HHMMSS) |
|---|---|
| 25 | 20100101 : 120000 |
| 86 | 20100101 : 150000 |
| 102 | 20100101 : 170000 |
| 108 | 20100101 : 173000 |

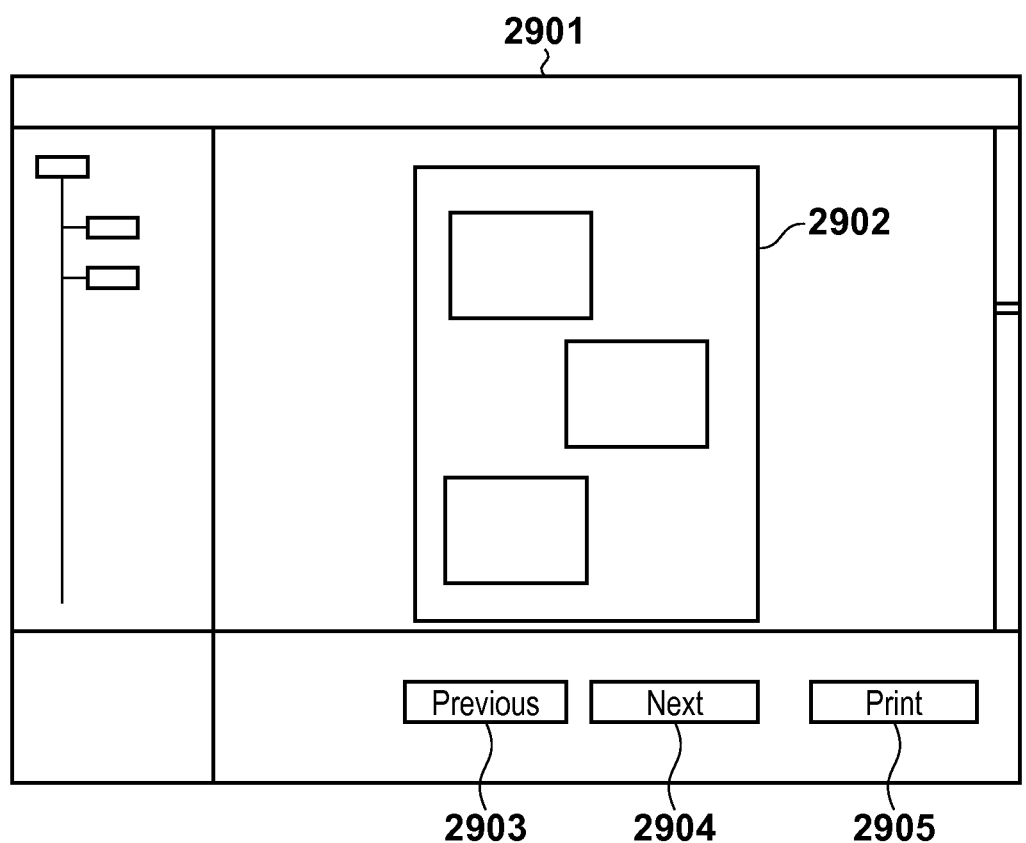
F I G. 26

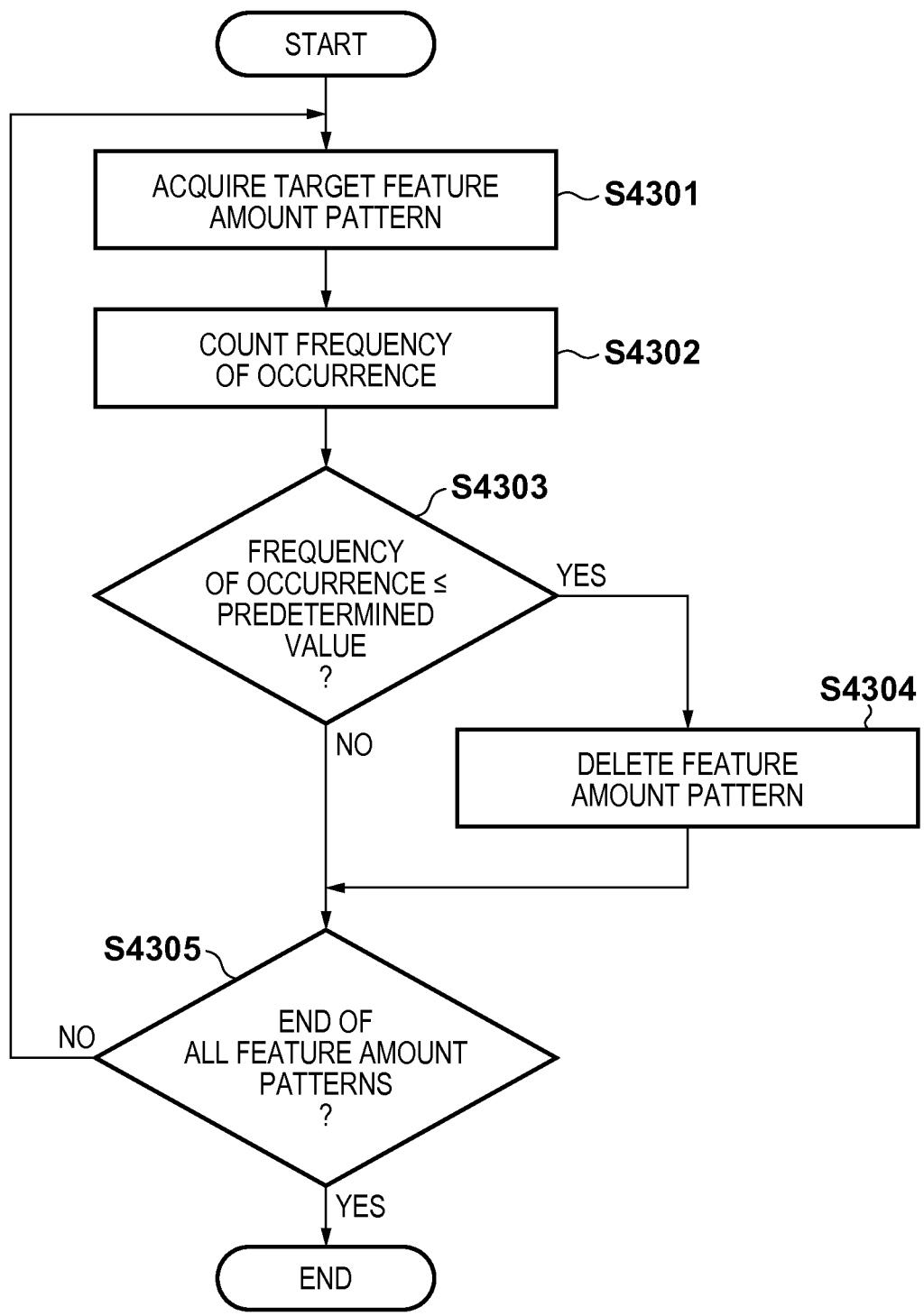
F I G. 37

INFORMATION PROCESSING APPARATUS AND CONTROL METHOD THEREOF

BACKGROUND OF THE INVENTION

1. Field of the Invention

The present invention relates to a technique for identifying a face of a person included in an image.

2. Description of the Related Art

Along with the popularization of digital still cameras (to be also described as "DSC" hereinafter), many image data (several thousands to several ten thousands of image data) are sometimes required to be handled. As an especially important technique as a handling method, images are handled using faces of persons, thus implementing person extraction.

The person extraction method is roughly classified into a face detection technique and personal recognition technique. The former technique is used to find out a face included in an image, and is used in judgment as to whether or not a face is included. The latter technique is used to specify a person of the detected face. Upon execution of person extraction, in order to identify each person, a database (face dictionary) used to store face feature patterns for respective persons is referred to. Then, based on images registered in the face dictionary, analysis processing of a newly added image is executed to implement person extraction.

Japanese Patent Laid-Open No. 2005-208850 (to be referred to as literature 1 hereinafter) discloses a technique which uses feature amounts of a plurality of different expressions and probability distribution parameters upon execution of personal recognition.

On the other hand, Japanese Patent Laid-Open No. 2011-134114 (to be referred to as literature 2 hereinafter) describes a precision drop prevention technique in association with variations of illuminations, directions of faces, and changes of expressions at the time of recognition. In association with each of a plurality of dictionary data prepared for respective data attributes, a correlation value between corresponding local patterns of input data and dictionary data is calculated. Sets of correlation values for respective data attributes are integrated to calculate a similarity of the input data, and identification is made based on that similarity.

Note that as a technique for updating a dictionary based on a recognition result using a recognition dictionary, Japanese Patent Laid-Open No. 06-095685 (to be referred to as literature 3 hereinafter) is available.

Patent literatures 1 and 2 above include descriptions corresponding to changes of expressions and illuminations so as to improve personal recognition precision, but the personal recognition precision is not sufficient.

SUMMARY OF THE INVENTION

The present invention has been made in consideration of the above problems. The present specification provides a technique which can enhance personal recognition precision in personal recognition processing of a face in an image.

In order to solve the aforementioned problems, for example, according to this disclosure, there is a provided an apparatus comprising: a management unit configured to classify feature patterns each including feature information of a plurality of parts of a face region of an object extracted from image data for respective objects, and to manage the feature patterns using a dictionary; a segmenting unit configured to determine whether or not a feature information of each part of the face region of the object is configured to be segmented, and to segment, when the segmenting unit determines that the feature information is configured to be segmented, the feature information of the part of interest into a plurality of feature information as new feature information; and a registration unit configured to register, when the segmenting unit segments the feature information, a feature pattern as a combination of the new feature information of the part of interest and feature information of parts other than the part of interest, which are managed by the management unit, in the dictionary as a new feature pattern of the object.

According to the aforementioned arrangement, the personal recognition precision can be enhanced. For example, the sufficient precision can be realized for images including different expressions in personal recognition processing of faces in digital images.

Further features of the present invention will become apparent from the following description of exemplary embodiments (with reference to the attached drawings).

BRIEF DESCRIPTION OF THE DRAWINGS

FIG. 10 is a table showing an example of attribute information obtained as a result of image analysis;

FIG. 11 is a view showing an example of a storage format of an image analysis result;

FIG. 12 is a table showing an example of attribute information which can be manually input by the user;

FIG. 15 is a view showing a UI example used to manually input person attribute information;

FIG. 20 is a view showing an example of automatic trimming processing;

FIG. 21 is a table showing an example of layout evaluation values used in automatic layout processing;

FIG. 26 is a view showing a display example of an automatic layout generation result;

FIG. 37 is a flowchart of feature amount pattern reduction processing according to the first and second embodiments.

DESCRIPTION OF THE EMBODIMENTS

Embodiments according to the present invention will be described in detail hereinafter with reference to the accompanying drawings.

An embodiment associated with generation of a face dictionary from images, person (object) extraction based on the face dictionary, and generation and proposal of a laid-out collage image will be described below. This is merely an example of an embodiment, and the present invention is not limited to the following embodiment.

<Hardware Arrangement>

Figure 1:
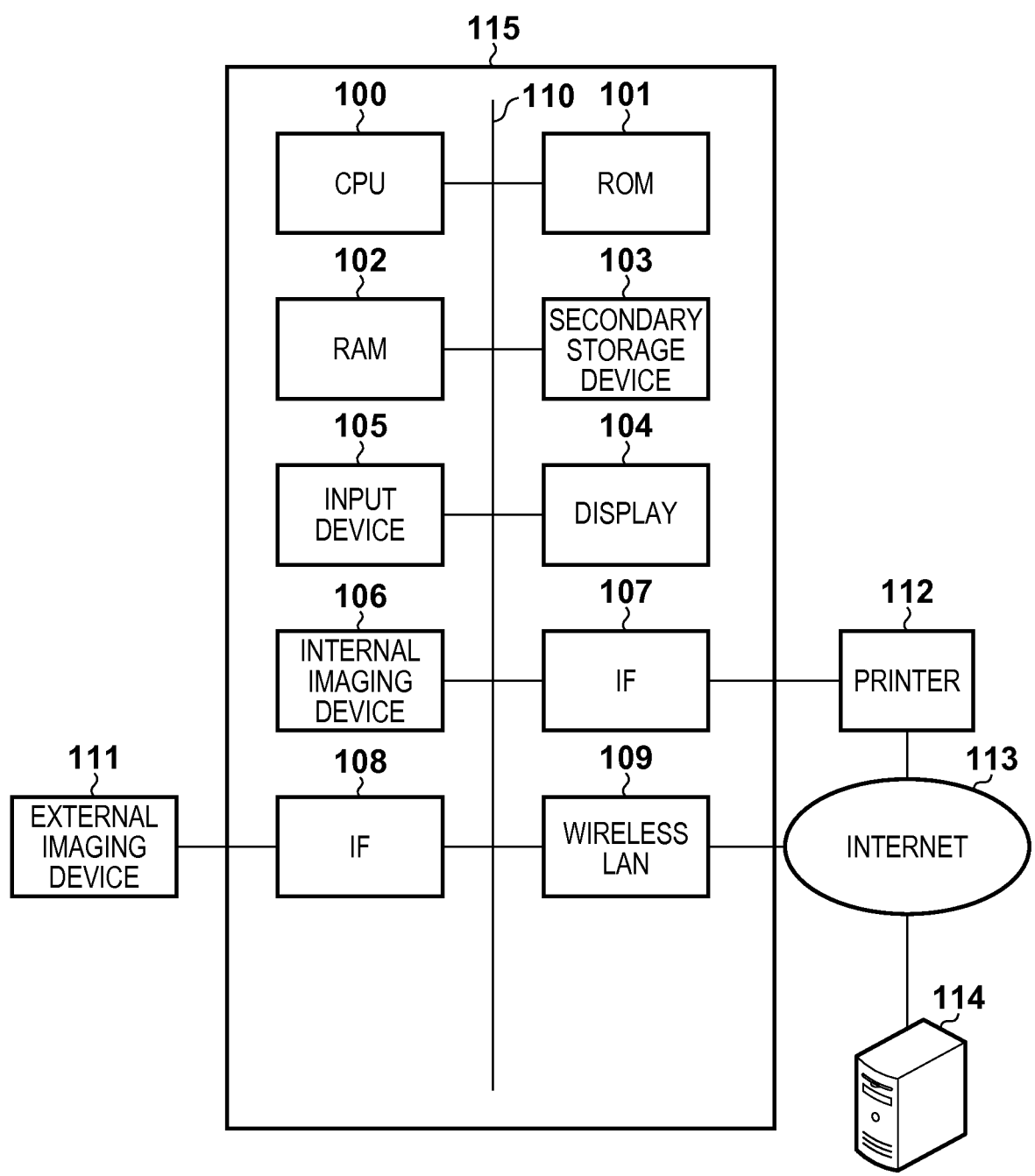
FIG. 1 is a block diagram showing the hardware arrangement which can execute software of the present invention.

FIG. 1 is a block diagram for explaining a hardware arrangement example of an information processing apparatus 115 according to the first embodiment. Referring to FIG. 1, the information processing apparatus 115 is, for example, a computer. This information processing apparatus 115 functions as an image processing apparatus. In FIG. 1, reference numeral 100 denotes a CPU (Central Processing Unit), which executes an information processing method to be described in this embodiment according to a program. The CUP 100 loads a program stored in a hard disk or the like to a RAM 102 and runs the program on the RAM 102, thereby controlling of the entire image arrangement control apparatus according to the present embodiment. Reference numeral 101 denotes a ROM, which stores a BIOS program to be executed by the CPU 100. Reference numeral 102 denotes a RAM, which stores an OS and application to be executed by the CPU 100, and also functions as a work memory required to temporarily store various kinds of information by the CPU 100. Reference numeral 103 denotes a secondary storage device such as a hard disk, which is a storage medium which serves as a storage/holding function of an OS and various applications, an image storage function of storing image files to be stored and managed, and a database function of storing image analysis results. Reference numeral 104 denotes a display device, which presents various UIs (User Interfaces) to be described later of processing results and the like of this embodiment to the user. As the display device 104, for example, a display may be used, and it may include a touch panel function. Reference numeral 110 denotes a control bus/data bus, which connects the aforementioned units and the CPU 100. In addition, the information processing apparatus 115 also includes an input device 105 such as a mouse and keyboard, which allow the user to input an image correction processing designation and the like.

The information processing apparatus 115 may include an internal imaging device 106. An image captured by the internal imaging device 106 is stored in the secondary storage device 103 via predetermined image processing. Also, image data may be loaded from an external imaging device 111 connected via an interface (IF) 108. Furthermore, the information processing apparatus 115 includes a wireless LAN (Local Area Network) 109, which is connected to the Internet 113. Images can also be acquired from an external server 114 connected to the Internet.

Finally, a printer 112 used to output an image and the like is connected via an IF 107. Note that the printer is further connected on the Internet, and can exchange print data via the wireless LAN 109.

<Software Block Diagram>

Figure 2:
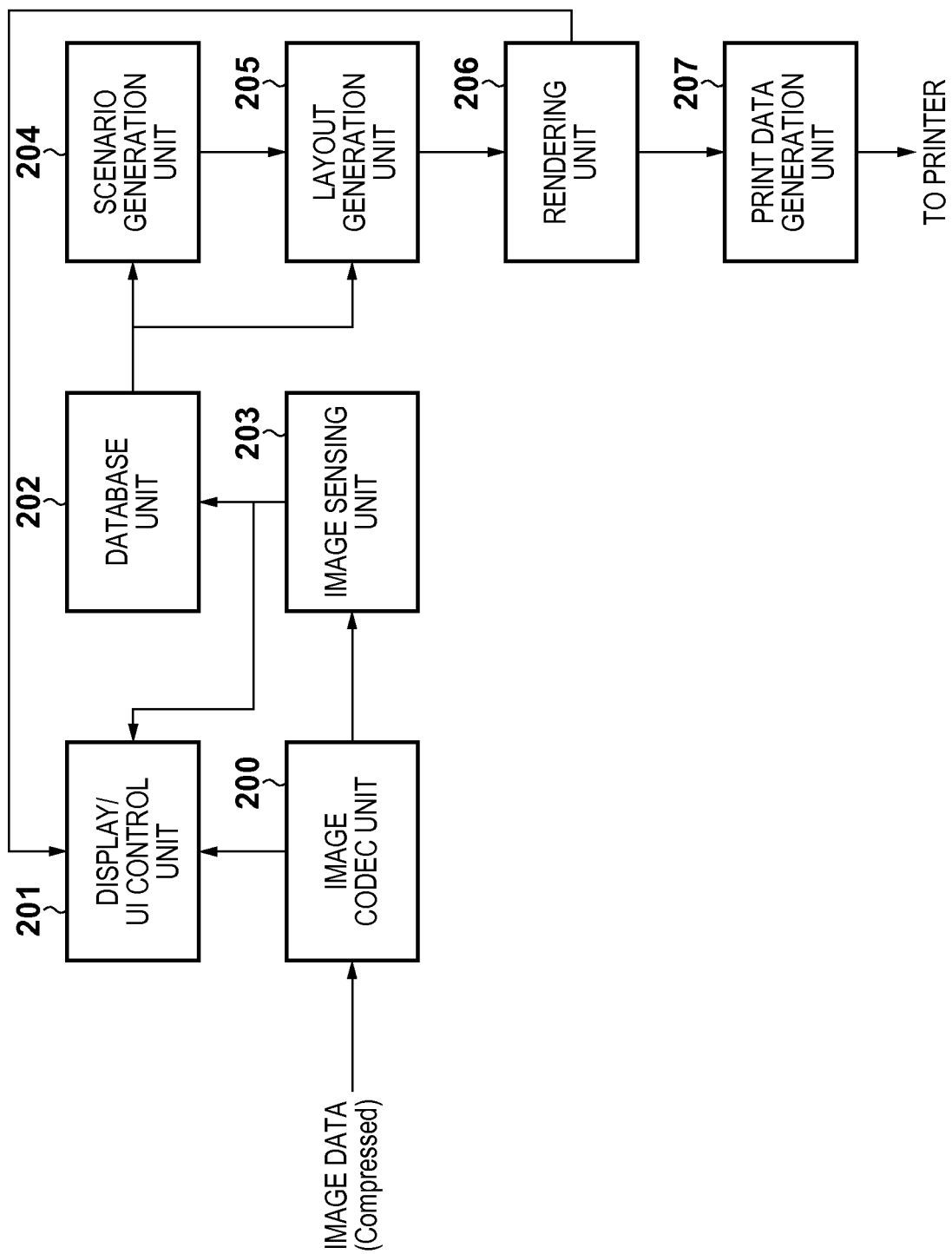
FIG. 2 is a software block diagram of processing according to the present invention.

FIG. 2 is a block diagram of a software configuration including applications to be executed by the CPU 100 of the information processing apparatus 115 according to this embodiment.

Image data, which is captured by a digital camera or the like, and is to be acquired by the information processing apparatus 115, normally has a compressed format such as JPEG (Joint Photography Expert Group). For this reason, an image codec unit 200 decompresses the compressed format to convert it into a so-called RGB dot-sequential bitmap data format. The converted bitmap data is transferred to a display/UI control unit 201, and is displayed on the display device 104 such as a display.

The bitmap data is further input to an image sensing unit 203 (application), which executes various kinds of analysis processing of an image, as will be described in detail later. Various kinds of attribute information of the image obtained as a result of the analysis processing are stored in the aforementioned secondary storage device 103 by a database unit 202 (application) according to a predetermined format. Note that in the following description, the image analysis processing is used synonymously with the sensing processing.

A scenario generation unit 204 (application) generates conditions of a layout to be automatically generated according to various conditions input by the user, as will be described in detail later. A layout generation unit 205 executes processing for automatically generating a layout according to the scenario.

A rendering unit 206 generates bitmap data required to display the generated layout, and sends the bitmap data to the display/UI control unit 201, thus displaying the result on the display. A rendering result is further sent to a print data generation unit 207, which converts the rendering result into printer command data. The printer command data is then output to the printer.

The sequence of basic image processing of this embodiment will be described below with reference to FIGS. 3 to 6.

Figure 3:
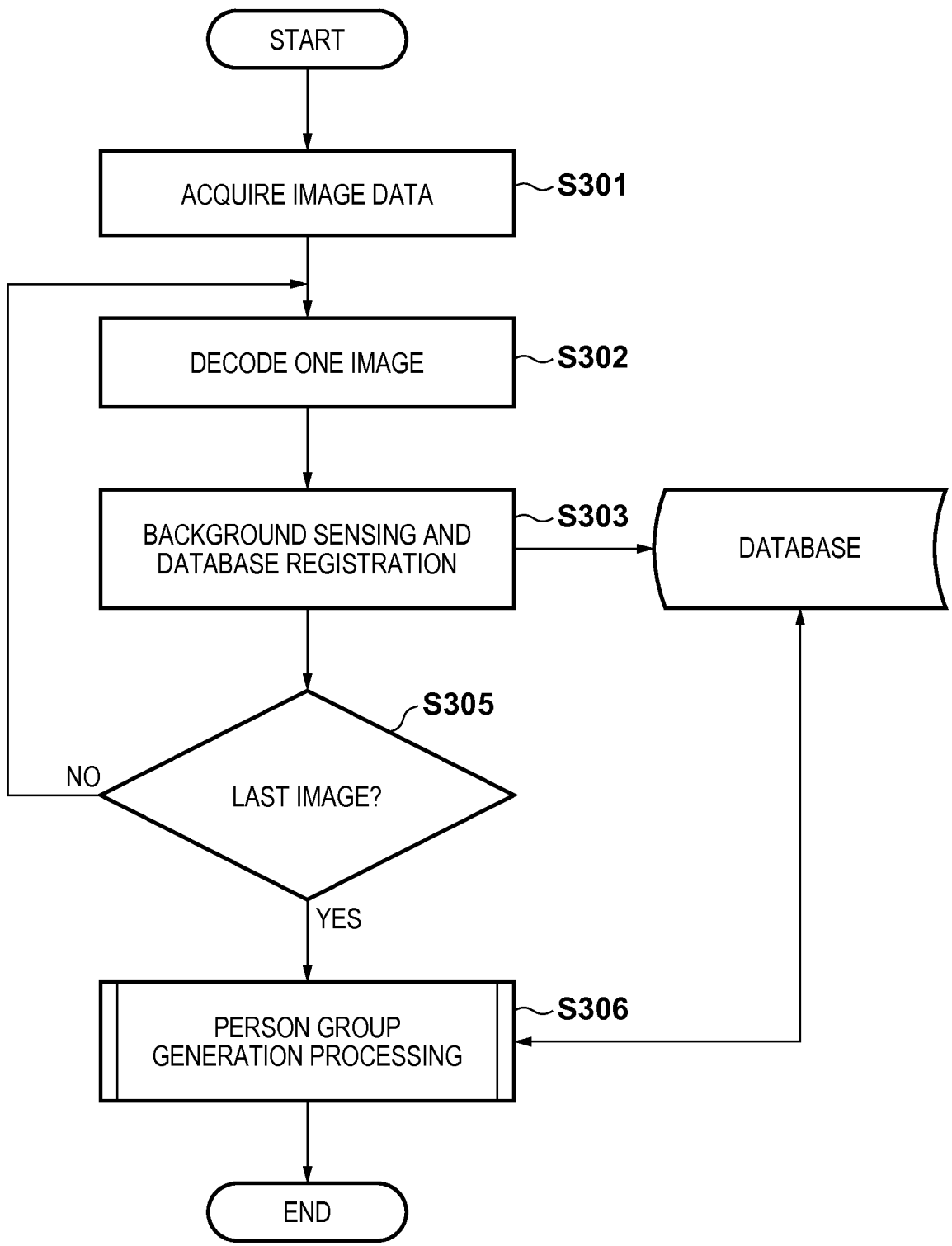
FIG. 3 is a flowchart of image analysis processing.
Figure 4:
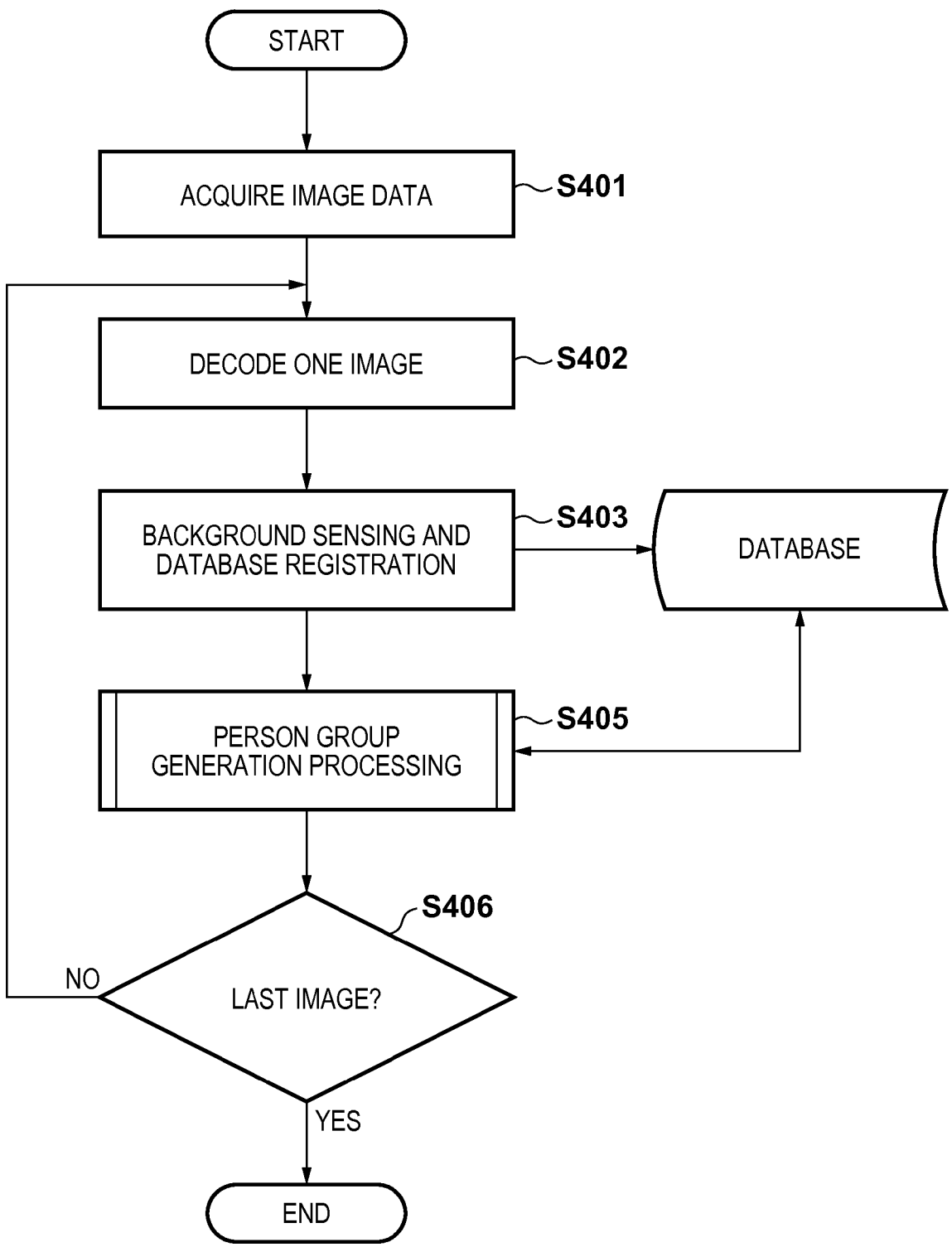
FIG. 4 is a flowchart of image analysis processing.
Figure 5:
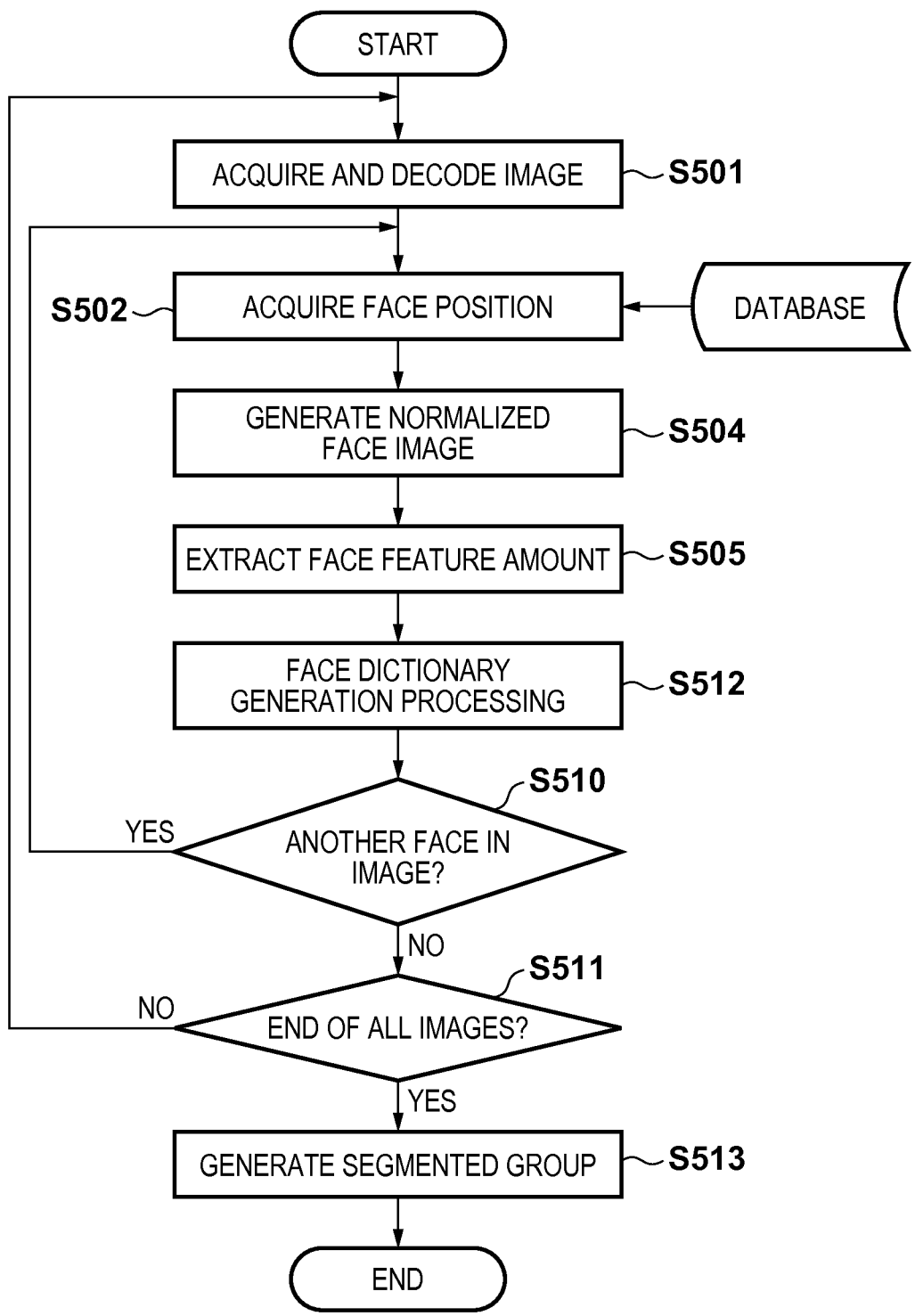
FIG. 5 is a flowchart of person group generation processing.
Figure 6:
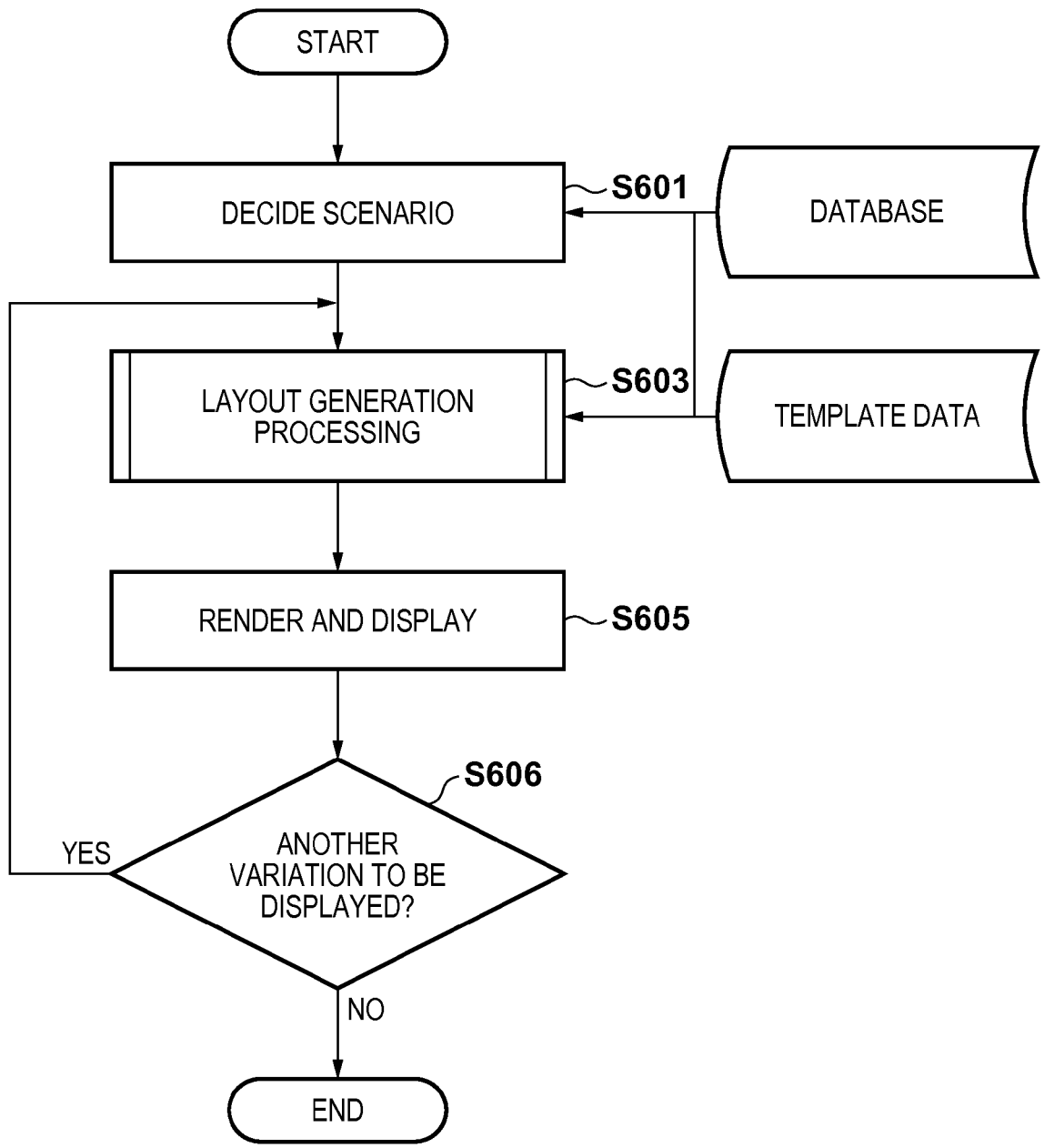
FIG. 6 is a flowchart of automatic layout proposal processing.

FIGS. 3 and 4 are flowcharts of the image sensing unit 203 and show processing sequences from when a plurality of image data are acquired until they respectively undergo analysis processing and results are stored in a database. FIG. 5 shows the sequence of person group generation processing required to group pieces of face information which seem the same person based on detected face position information. FIG. 6 shows the processing sequence required to determine a scenario used to generate a layout based on image analysis information and various kinds of information input by the user, and to automatically generate a layout based on the scenario.

The sequence of processing to be executed by the image sensing unit 203 will be described below with reference to FIG. 3. In step S301 of FIG. 3, image data are acquired. The image data are acquired, for example, when the user connects an imaging device or memory card which stores captured images to the information processing apparatus 115 and the captured images are loaded from them. Also, as images, those which are captured by the internal imaging device and are stored in the secondary storage device 103 can also be loaded. Alternatively, the image data may be acquired from a location other than the local information apparatus 115 (for example, the external server 114 connected to the Internet).

Figure 8:
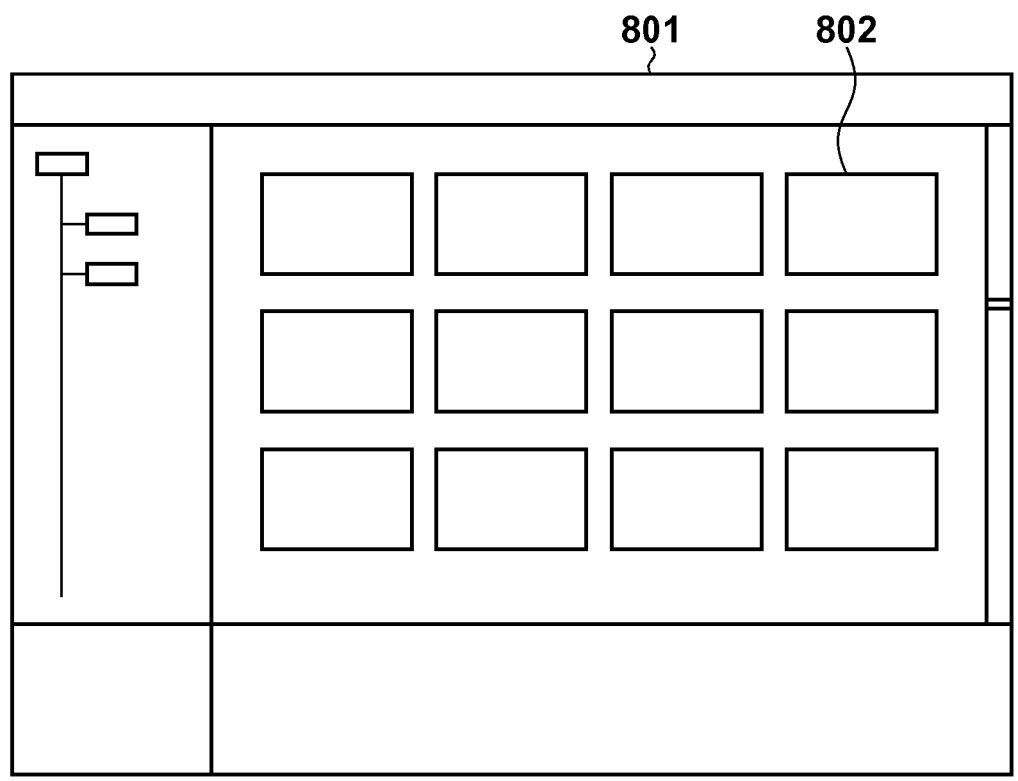
FIG. 8 is a view showing a display example of images in a thumbnail format.
Figure 9:
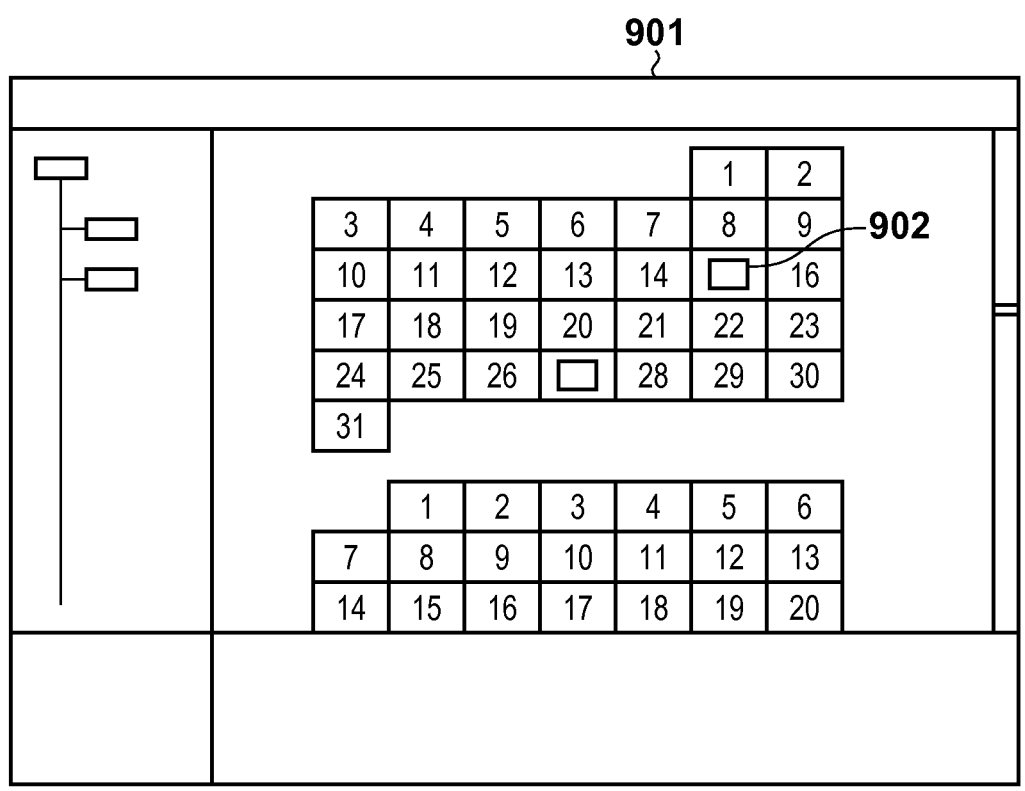
FIG. 9 is a view showing a display example of images in a calendar format.

Display on the display device 104 upon acquisition of image data will be described below with reference to FIGS. 8 and 9. After the image data are acquired, their thumbnails are displayed on a UI, as shown in FIGS. 8 and 9. The UI display method on the display device 104 is not particularly limited as long as images can be confirmed. Thumbnails 802 of images may be displayed for each folder in the secondary storage device 103, as denoted by reference numeral 801 in FIG. 8, or image data may be managed for respective dates on a UI 901 like a calendar, as shown in FIG. 9. When the user clicks a day part 902 on the UI 901 shown in FIG. 9, images captured on that day are displayed as a thumbnail list shown in FIG. 8.

Next, in steps S302 to S305, the acquired image data respectively undergo analysis processing, and analysis results are registered in a database.

More specifically, in step S302, each image is decoded. The application searches for an new image which is stored but does not undergo sensing processing yet, and the codec unit converts each extracted image from compressed data into bitmap data.

In step S303, various kinds of sensing processing are applied to the bitmap data. As the sensing processing in this step, various processes shown in FIG. 10 are assumed. In this embodiment, as an example of the sensing processing, face detection, face region feature amount analysis, image feature amount analysis, and scene analysis are used, and respectively calculate results of data types shown in FIG. 10. In this embodiment, as image basic feature amounts, an average luminance (int: a value ranging from 0 to 255), an average saturation (int: 0 to 255), and an average hue (int: a value ranging from 0 to 359) were analyzed. As face detection, the number of person's faces (int: a value not less than 0 (0 to MAXFACE)), and a coordinate position (int*8: values not less than 0 (similarly for Width and Height) as position information of each person's face were analyzed. Furthermore, an average Y (int: a value ranging from 0 to 255) in a face region, an average Cb (int: a value ranging from −128 to 127) in a face region, and an average Cr (int: a value ranging from −128 to 127) in a face region were analyzed. The respective sensing processes will be described below.

Since an entire average luminance and average saturation as basic feature amounts of an image can be calculated by known methods, they will be briefly described. As for the average luminance, RGB components of respective pixel of an image can be converted into known luminance/color difference components (for example, YCbCr components) (conversion formulas are not shown), and an average value of Y components can be calculated. As for the average saturation, a value S can be calculated for CbCr components of each pixel, and an average value of the values S can be calculated. The value S is calculated by:

$$S = (Cb^2 + Cr^2)^{1/2}$$

An average hue AveH in an image is a feature amount used to evaluate a tincture of the image. A hue value for each pixel can be calculated using a known HIS conversion formula, and these hue values are averaged for the entire image, thus calculating AveH.

The feature amounts may be calculated for the entire image or may be calculated for, for example, respective regions obtained by dividing an image into regions each having a predetermined size.

Next, person's face detection processing will be described below. As a person's face detection method used in this embodiment, various already available methods can be used. Japanese Patent Laid-Open No. 2002-183731 describes the following method. That is, eye regions are detected from an input image, and a region around the eye regions is extracted as a face candidate region.

For this face candidate region, luminance gradients for respective pixels and weights of the luminance gradients are calculated, and these values are compared with gradients and weights of the gradients of an ideal face reference image, which is set in advance. At this time, when an average angle between respective gradients is not more than a predetermined threshold, it is determined that an input image has a face region.

Also, according to Japanese Patent Laid-Open No. 2003-30667, a flesh color region is detected from an image, and human iris color pixels are detected in that region, thus allowing detection of eye positions.

According to Japanese Patent Laid-Open No. 8-63597, matching degrees between a plurality of templates having face shapes and an image are calculated. A template having the highest matching degree is selected, and when the highest matching degree is not less than a predetermined threshold, a region in the selected template is detected as a face candidate region. Using that template, eye positions can be detected.

According to Japanese Patent Laid-Open No. 2000-105829, an entire image or a designated region in the image is scanned using a nose image pattern as a template, and a most matched position is output as a nose position. Next, a region above the nose position of the image is considered as that including eyes, and the eye including region is scanned using an eye image pattern to calculate matching degrees, thus calculating an eye including candidate position set as a set of pixels having matching degrees larger than a certain threshold. Furthermore, continuous regions included in the eye including candidate position set are divided as clusters, and distances between the clusters and nose position are calculated. A cluster having the shortest distance is determined as that including eyes, thus allowing to detect part positions of a face.

In addition, as methods of detecting a face and part positions, Japanese Patent Laid-Open Nos. 8-77334, 2001-216515, 5-197793, 11-53525, 2000-132688, 2000-235648, 11-250267, and the like are available. Furthermore, many methods such as Japanese Patent No. 2541688 have been proposed. In this embodiment, the method is not particularly limited.

As a result of the processing, the number of person's faces and coordinate positions for respective faces in an image can be acquired for each input image.

When face coordinate positions in an image can be detected, an average YCbCr value of pixel values included in each face region can be calculated, an average luminance and average color differences of that face region can be obtained.

Also, scene analysis processing can be executed using feature amounts of an image. For example, techniques disclosed in Japanese Patent Laid-Open Nos. 2010-251999 and 2010-273144 by the present applicant can be used. As a result of the scene analysis, IDs used to distinguish imaging scenes such as "Landscape", "Nightscape", "Portrait", "Underexposure", and "Others" from each other can be acquired.

Note that sensing information is not limited to that acquired by the aforementioned sensing processes, and for example, other sensing information may be used.

The sensing information acquired as described above is stored in the database 202. Although a storage format in the database is not particularly limited, the sensing information may be described and stored using, for example, a versatile format (for example, XML: eXtensible Markup Language) shown in FIG. 11.

FIG. 11 shows an example in which pieces of attribute information for respective images are described while being classified into three categories. A first BaseInfo tag indicates information appended in advance to an acquired image file as an image size and captured time information. This field includes an identifier ID of each image, a storage location where the image file is stored, an image size, a captured date and time, and the like.

A second SensInfo tag is required to store the aforementioned image analysis processing results. An average luminance, average saturation, average hue, and scene analysis result of the entire image are stored, and information associated with a face position and face color of a person included in the image can be further described.

Then, a third UserInfo tag can store information input by the user for each image, and details will be described later.

Note that the database storage method of the image attribute information is not limited to the above method. Any other known formats may be used.

<Person Grouping Using Personal Recognition Processing>

Next, in step S306 of FIG. 3, processing for generating groups for respective persons using the face position information detected in step S303 is executed. By automatically grouping person's faces in advance, the user can efficiently name respective persons later.

The person group generation processing is executed by the processing sequence shown in FIG. 5 using a known personal recognition technique.

FIG. 5 is a basic flowchart of person group generation processing in step S306.

Initially, in step S501, an image stored in the secondary storage device is sequentially read out and decoded. Furthermore, in step S502, a database S503 is accessed to acquire the number of faces included in the image and position information of each face. In step S504, normalized face images required to execute personal recognition processing are generated.

Note that the normalized face images are face images obtained by extracting faces which are included in the image and have various sizes, directions, and resolutions and converting all of these faces to have a predetermined size and direction. In order to execute personal recognition, since positions of parts such as eyes and a mouth are important, each normalized face image desirably has a size that allows the parts to be surely recognized. By preparing the normalized face images in this way, feature amount detection processing need not cope with faces having various resolutions.

Next, in step S512, face dictionary generation processing required to classify faces for respective objects is executed. Based on a face image, a face position of which is acquired from a target image in step S502, and a normalized face image of which is generated in step S504, a face dictionary is generated. This processing will be described in detail later.

It is determined in step S510 whether or not image data to be processed includes another face region. If another face region is included (YES in step S510), the process returns to step S502. On the other hand, if another face region is not included (NO in step S510), the process advances to step S511. It is determined in step S511 whether or not the processes of steps S502 to S510 are complete for all images. If the processes are complete for all the images, the processing ends; otherwise, the process returns to step S502. That is, after the face dictionary is generated using all faces and all images by the determination processes of steps S510 and S511, segmented group generation processing of the face dictionary is executed in step S513. In this processing, the face dictionary generated based on target images is analyzed to generate further segmented groups. This processing will also be described in detail later.

The grouping results are stored in the aforementioned database using a format such as XML.

Note that in this embodiment, the person group generation processing is executed after completion of the sensing processing of all images, as shown in FIG. 3. However, the present invention is not limited to this. For example, as shown in FIG. 4, after the sensing processing is executed for each image in step S403, the grouping processing is executed using face detected position information in step S405, and these processes are repeated for all image data, thus generating the same result.

Figure 7:
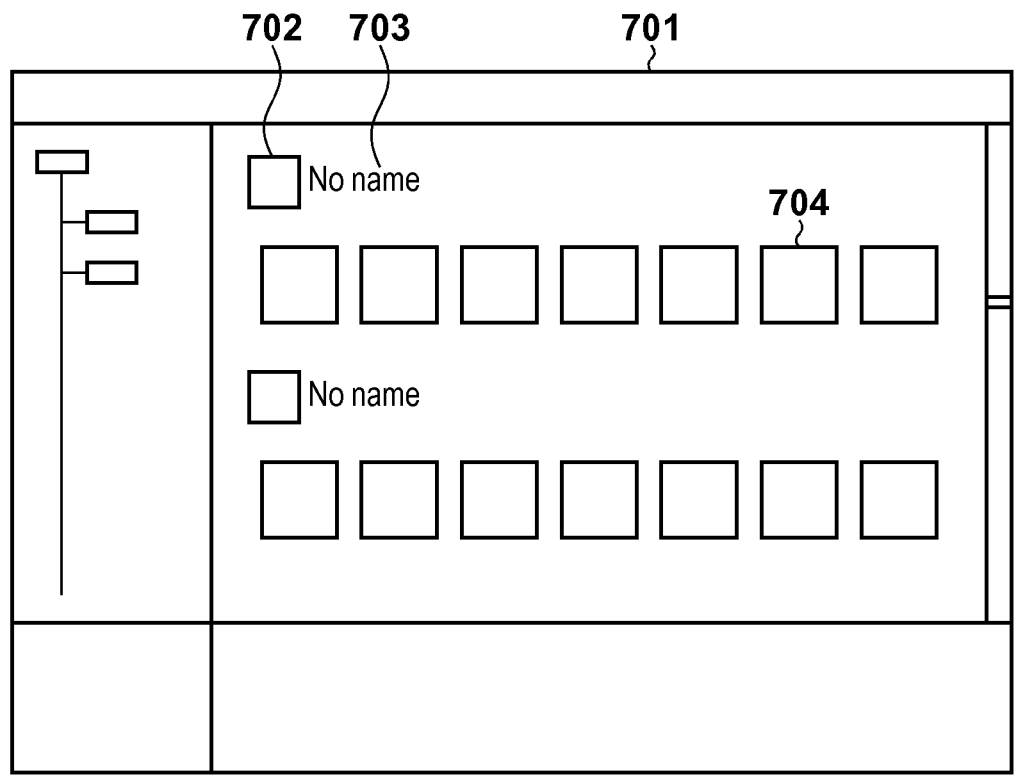
FIG. 7 is a view showing a display example of person groups.

The respective person groups obtained by the aforementioned processing are displayed using a UI 701 shown in FIG. 7. Referring to FIG. 7, reference numeral 702 denotes a representative face image of a person group, and a field 703 which displays a name of that person group is laid out beside the image 702. Immediately after completion of the automatic person grouping processing, a person name "No name" is displayed, as shown in FIG. 7. Reference numeral 704 denotes a plurality of face images included in that person group. As will be described later, on the UI shown in FIG. 7, the user can input a person name and information such as a birthday and relationship for each person by designating the "No name" field 703.

The sensing processing may use a background task of an operating system. In this case, even when the user carries out a different task on the computer, the sensing processing of images can be continued.

<Input of User Information (Person Name, Birthday, Preference Degree, etc.)>

In this embodiment, the user may manually input various kinds of attribute information associated with images, or various kinds of attribute information associated with images may be automatically set.

FIG. 12 shows a list of an example of attribute information. Manual registration information is roughly classified into image attribute information to be set for each image, and person attribute information to be set for each person grouped by the aforementioned processing.

Figure 13:
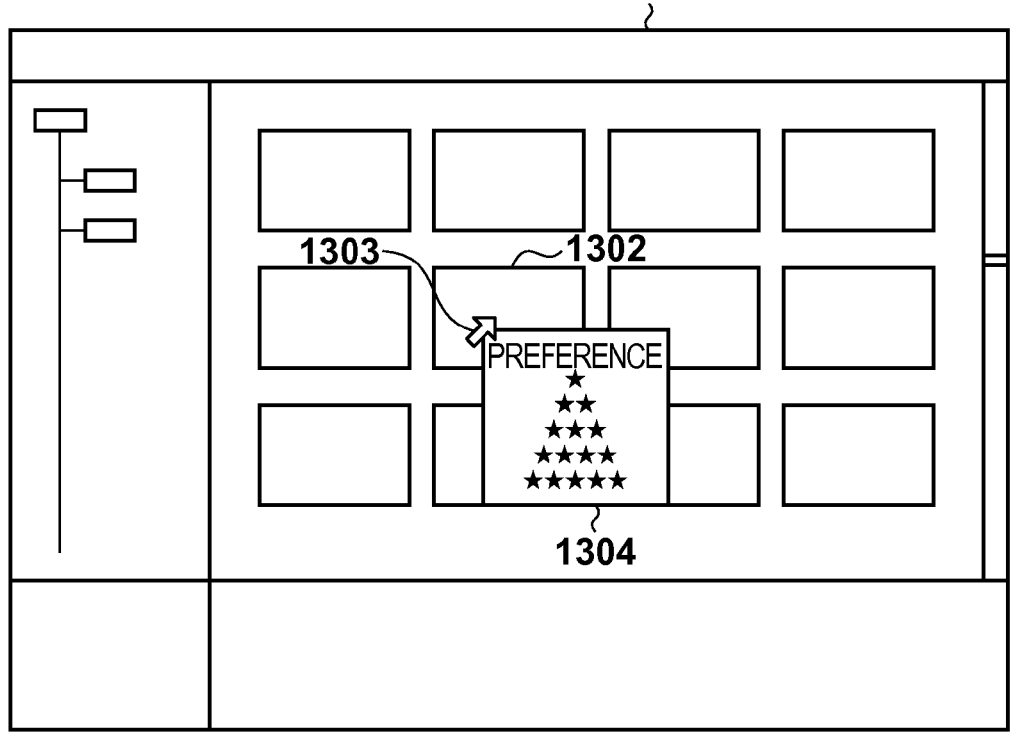
FIG. 13 is a view showing a UI example used to manually input a preference degree.

As attribute information to be set for each image, a user's preference degree is set. As the preference degree, for example, the user can manually input information indicating whether or not he or she likes that image. For example, as shown in FIG. 13, the user selects a desired thumbnail image 1302 using a mouse pointer 1303 on a UI 1301, and clicks a right mouse button, thereby displaying a dialog 1304 which allows the user to input a preference degree. The user can select the number of ★'s according to his or her preference. In this embodiment, as the preference degree is higher, the number of ★'s is set to be increased.

Also, the preference degree may be automatically set without being manually set by the user. For example, assume that the user clicks a desired image file in a displayed image thumbnail list shown in FIG. 8 to transit the current screen to a one-image display screen. Then, a transition count may be measured, and a preference degree may be automatically set according to the count. That is, as the browse count of an image is larger, it is judged that the user likes that image.

As another example, a preference degree may be automatically set according to a print count. For example, when the user makes a print operation of a given image, it is judged that he or she likes that image, and as the print count is larger, it is judged that a preference degree is higher.

As described above, the method of manually setting the preference degree by the user, and the method of automatically setting the preference degree based a browse count and print count are available. The pieces of set and measured information are individually stored in a UserInfo tag of the database 202 in an XML format shown in FIG. 11. For example, the preference degree is stored using a FavoriteRate tag, the browse count is stored using a ViewingTimes tag, and the print count is stored using a PrintingTimes tag.

Figure 14:
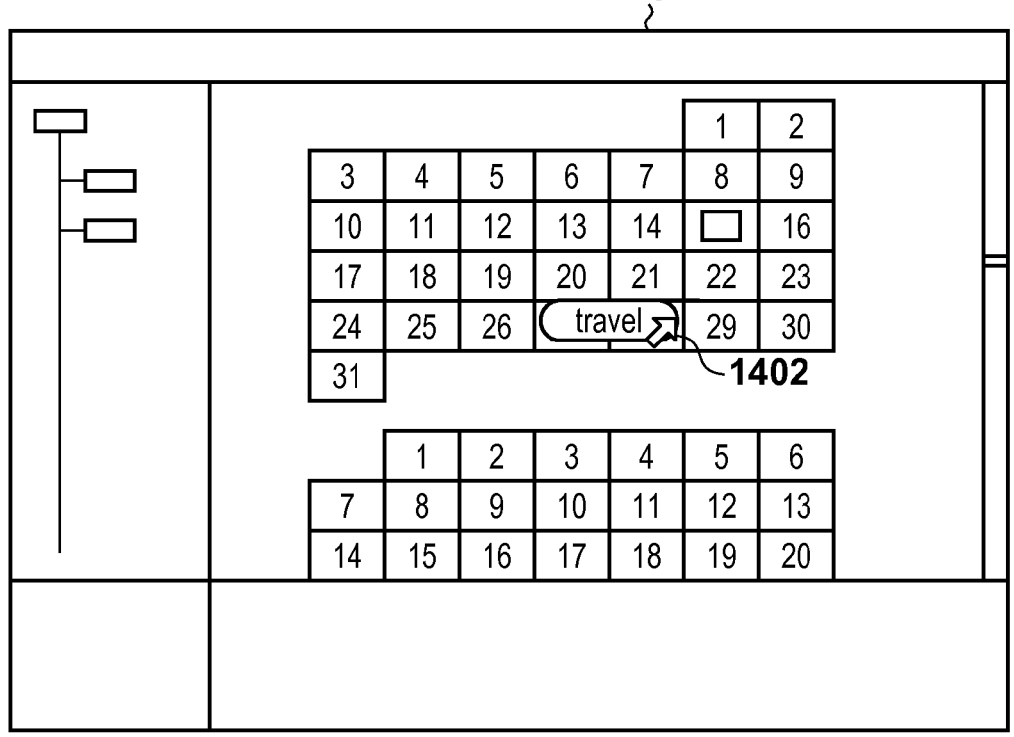
FIG. 14 is a view showing a UI example used to manually input event information.

As another information to be set for each image, event information may be used. The event information indicates, for example, "travel", "graduation", or "wedding". The user may designate an event by designating a desired date on a calendar using a mouse pointer 1402 or the like, and inputting an event name of that day, as shown in FIG. 14. The designated event name is included in the XML format shown in FIG. 11 as a part of image attribute information. In the format shown in FIG. 11, the event name and image are associated (linked) using an Event tag in the UserInfo tag.

Person attribute information will be described below.

FIG. 15 shows a UI 1501 used to input person attribute information. Referring to FIG. 15, reference numeral 1502 denotes a representative face image of a predetermined person ("father" in this case). Reference numeral 1503 denotes a character string ("father" in FIG. 15) which is set by the user to specify the person. A list 1504 displays images which are detected from other images and are judged in step S506 to have similar face feature information such as face feature amounts to those of the person "father".

Immediately after completion of the sensing processing, a GUI 701 shown in FIG. 7 is displayed. On this GUI 701, no name is input to each person group. By designating a "No name" portion 703 using a mouse pointer, an arbitrary person name can be input.

As attributes for each person, a birthday of that person and a relationship viewed from the user who operates the application can also be set. In this embodiment, when the user clicks the representative image 1502 of the person in FIG. 15, he or she can input a birthday of the clicked person in a first input field 1505 and relationship information in a second input field 1506, as shown in a lower portion of a screen.

The input person attribute information is managed in the database 202 in the XML format independently of the aforementioned image attribute information linked with images.

In this embodiment, various layout templates are prepared in advance. Layout templates are as denoted by reference numerals 1701 and 1901 in FIGS. 16 and 17, and are configured by a plurality of image layout frames 1702, 1902, and 1903 (to be used synonymously with "slots" hereinafter) on a paper size to be laid out.

A large number of such templates are prepared, and can be stored in the secondary storage device 103 in advance when software required to execute this embodiment is installed in the information processing apparatus 115. As another method, arbitrary templates may be acquired from the server 114 on the Internet, which is connected via the IF 107 and wireless LAN 109.

Assume that these templates are described using a versatile page description language, for example, XML in the same manner as storage of the aforementioned sensing results. In this embodiment, a large number of such templates are held.

As described above, the application presented by this embodiment can execute the analysis processing for input images, and can automatically group persons to display them on the UI. The user who checks the results can input attribute information such as names and birthdays for respective person groups, and can set preference degrees and the like for respective images.

Furthermore, a large number of layout templates, which are classified for respective themes, can be held.

When the aforementioned conditions are satisfied, the application of this embodiment executes processing for automatically generates a collage image that the user may like and presenting the layout to the user at a predetermined timing. This processing will be referred to as layout proposal processing hereinafter.

FIG. 6 is a basic flowchart required to execute the layout proposal processing.

Referring to FIG. 6, in step S601, a scenario of proposal processing is determined. The scenario includes determination of a theme of a layout to be proposed and a template with reference to a database and templates, settings of a person (main character) to be weighted heavily in the layout, and selection information of images used in layout generation.

For the sake of simplicity, examples of two scenarios will be described below.

For example, assume that it is set in advance to automatically generate and present a collage layout when a day two weeks before a birthday of each person is reached. Then, assume that a day two weeks before the first birthday of a person "son" automatically grouped in FIG. 15 is reached. In this case, a theme of a layout to be proposed is determined as a growth record "growth". Next, a template is selected. In this case, a template shown in FIG. 17, which is suited to the growth record, is selected. Next, images used in the layout are selected. In case of this example, with reference to the database, large quantities of images including "son" are extracted and listed from those captured since the birthday of the person "son" until now. The scenario determination processing for the growth record layout has been described.

Figure 16:
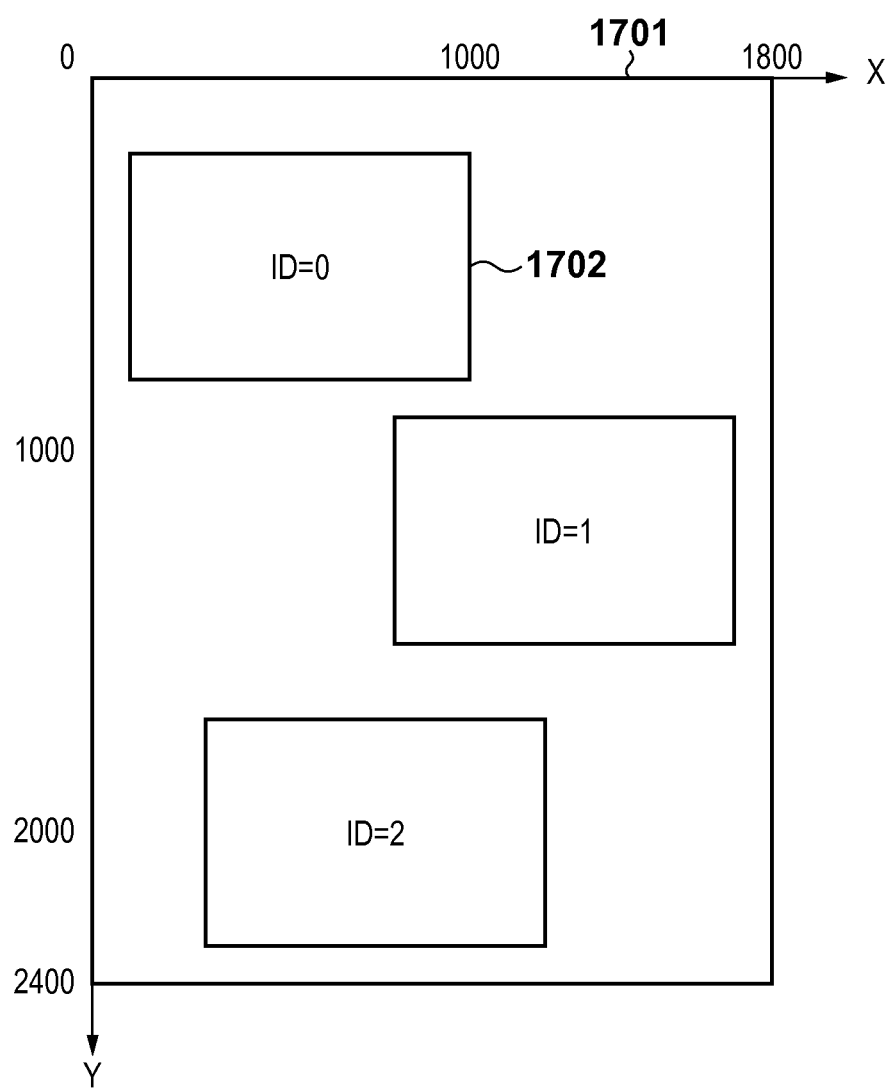
FIG. 16 is a view showing an example of a layout template.
Figure 17:
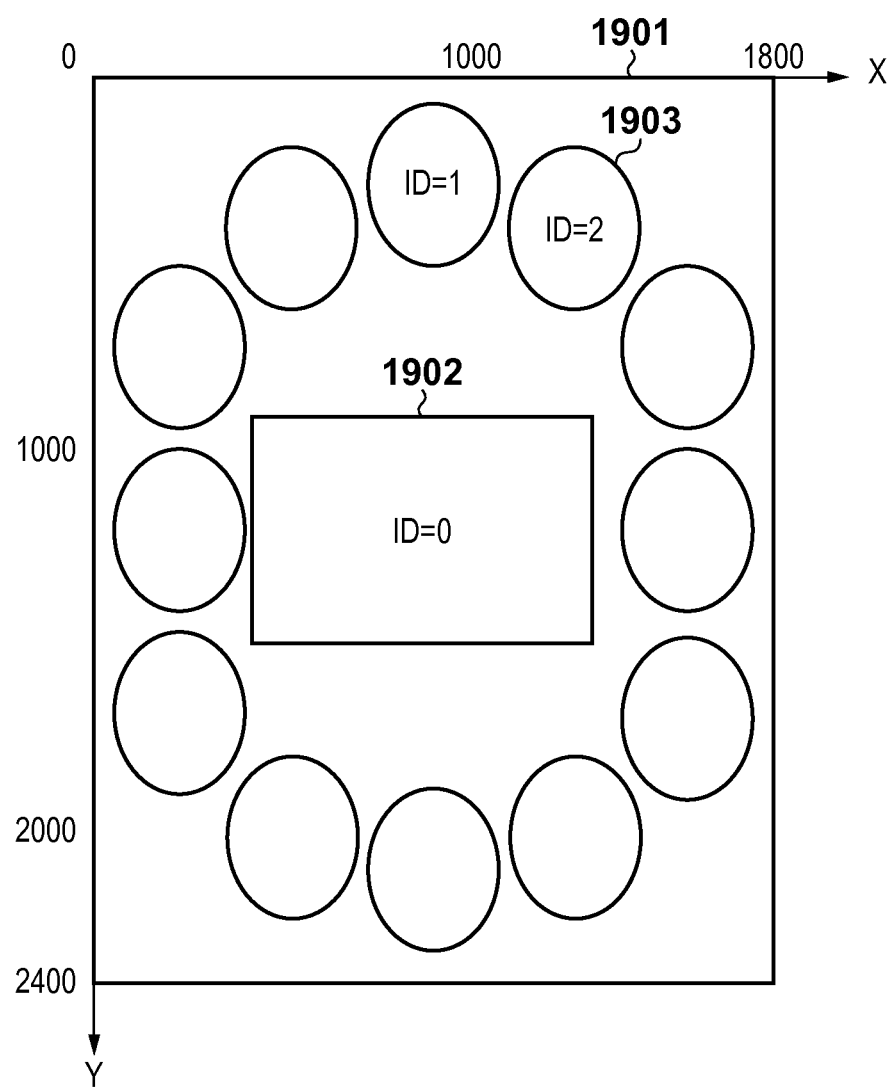
FIG. 17 is a view showing an example of a layout template.

As an example different from the above example, assume that it is set in advance to automatically generate and present a collage layout when photos of a travel, which were captured within one month are stored. When it is revealed based on event information registered in FIG. 14 that the user went a family travel a few days ago, and large quantities of images of that travel are stored in the secondary storage device, the scenario determination unit determines a scenario required to propose a layout of the family travel. In this case, a theme of a layout to be proposed is determined as "travel", and a layout shown in FIG. 16 is selected. Next, images to be used in the layout are selected. In case of this example, with reference to a database S602, large quantities of images linked with the travel event are extracted and listed. The scenario determination processing for the family travel layout has been described.

Figure 18:
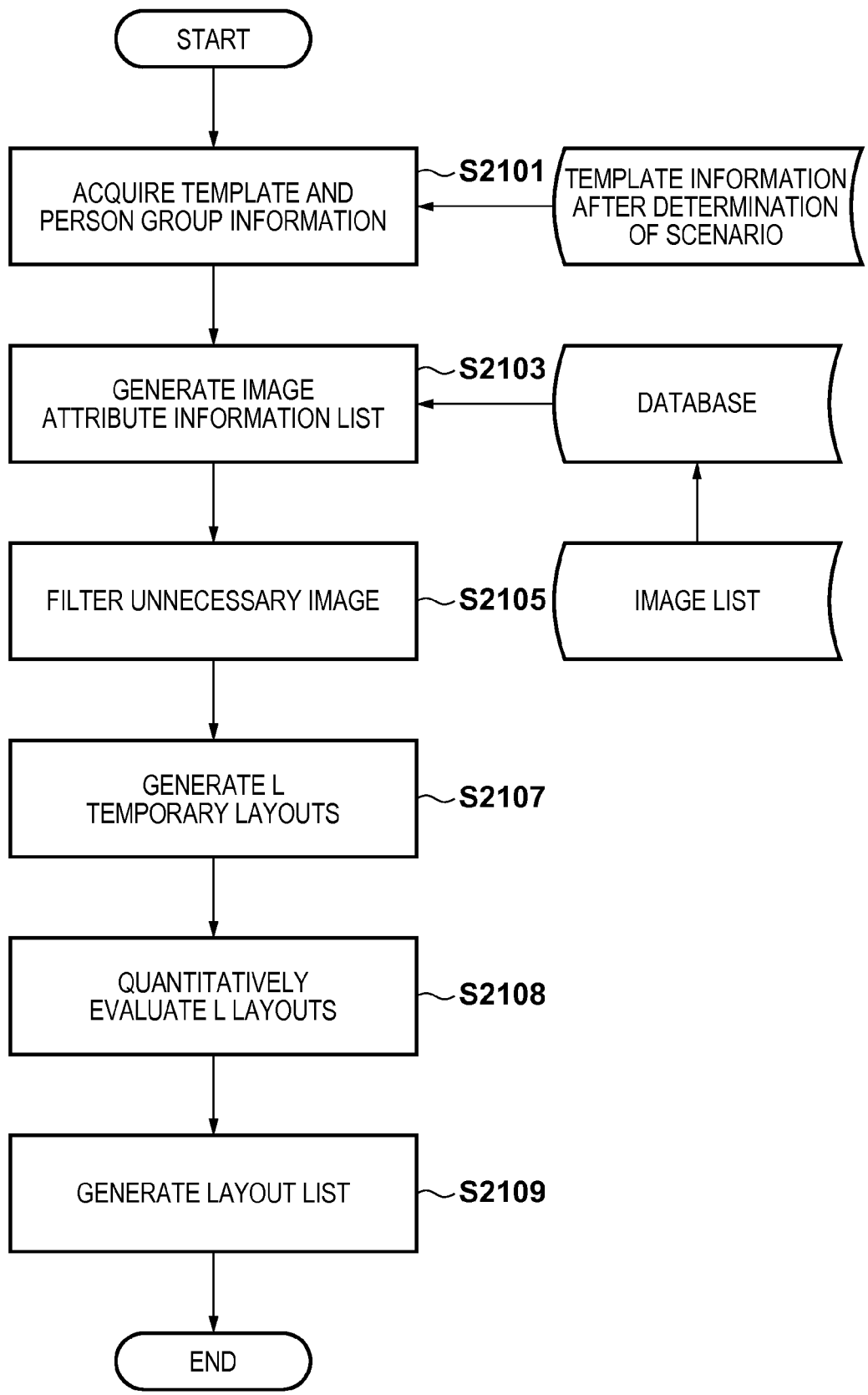
FIG. 18 is a flowchart of automatic layout generation processing according to the first embodiment.

Next, in step S603 in FIG. 6, automatic generation processing of the layout based on the aforementioned scenario is executed. The layout automatic generation processing based on the scenario will be described below with reference to FIG. 18. FIG. 18 shows detailed processing sequence of the layout processing unit.

Referring to FIG. 18, layout template information which is determined in the aforementioned scenario generation processing and is set with the layout theme and person group information is acquired from the database in step S2101.

In step S2103, feature information such as feature amounts of each image are acquired from the database for respective images based on an image list determined by the scenario, thus generating an image attribute information list. The image attribute information list has a configuration in which IMAGEINFO tags shown in FIG. 11 are arranged as many as the number of images included in the image list. Then, automatic layout generation processing in steps S2105 to S2109 is executed based on this image attribute information list.

In this manner, in the automatic layout generation processing of this embodiment, attribute information, which is stored in the database by executing the sensing processing for each image in advance, is used without directly handing image data itself. This is because a very huge memory area is required to store images when image data themselves are used as targets upon execution of the layout generation processing. That is, by using the attribute information stored in the database unit as in this embodiment, a use amount of a memory area can be reduced.

Figure 19:
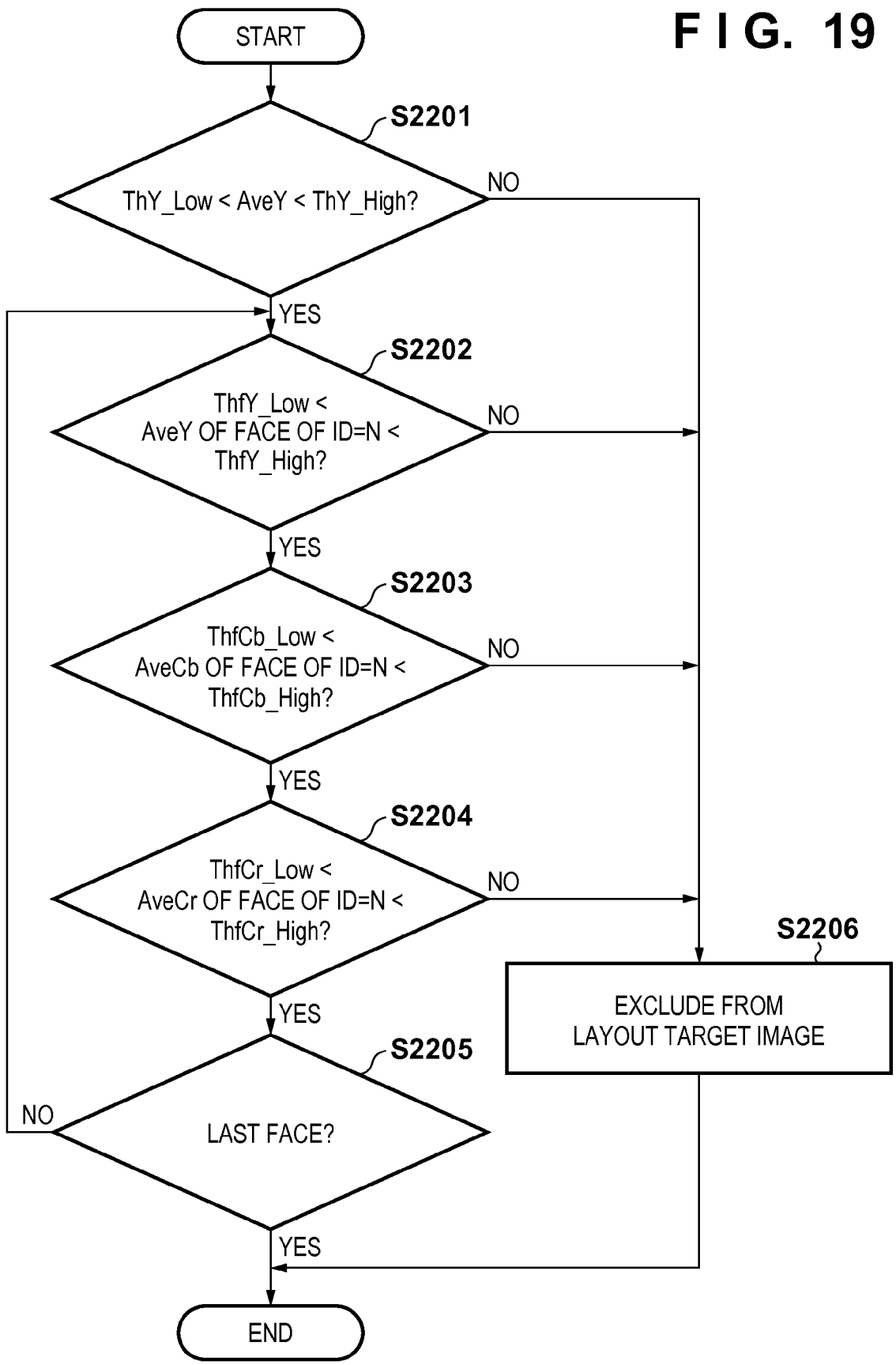
FIG. 19 is a flowchart of unnecessary image filtering processing according to the first embodiment.

Next, in step S2105, unnecessary images are filtered from the input images using the attribute information of the input images. The filtering processing is executed according to the sequence shown in FIG. 19. Referring to FIG. 19, it is determined in step S2201 for each image if an overall average luminance is included in a range between certain thresholds (ThY_Low and ThY_High). If NO in step S2201, the process advances to step S2206 to exclude an image of interest from layout targets. More specifically, it is determined in step S2202 whether or not AveY of a face region with an ID=N is included a range of predetermined thresholds (ThfY_Low and ThfY_High). It is determined in step S2203 whether or not AveCb of the face region with the ID=N is included a range of predetermined thresholds (ThfCb_Low and ThfCb_High). It is determined in step S2204 whether or not AveCr of the face region with the ID=N is included a range of predetermined thresholds (ThfCr_Low and ThfCr_High). It is determined in step S2205 whether or not the face region of interest is the last face. If the face region of interest is not the last face, the process returns to step S2202; otherwise, the processing ends.

Likewise, it is determined in steps S2202 to S2205 for each face region included in the image of interest whether or not an average luminance and average color difference components are included in a predetermined threshold range indicating a satisfactory flesh color region. Only an image for which YES is determined in all steps S2202 to S2205 is applied to the subsequent layout generation processing.

Note that since this filtering processing is executed for the purpose of excluding images which are apparently judged to be unnecessary in the subsequent temporary layout generation processing, it is desirable to set relatively moderate thresholds. For example, when a difference between ThY_Low and ThY_High in the determination of the entire image luminance in step S2201 is extremely smaller than an image dynamic range, the number of images for which YES is determined is decreased accordingly. Therefore, in the filtering processing of this embodiment, the thresholds are set so that the difference between ThY_Low and ThY_High is set to be as large as possible, but images which are judged as apparently abnormal images can be excluded.

Next, in step S2107 in FIG. 18, using images selected as layout targets in the above processing, temporary layouts of a large number of (L) images are generated. The temporary layouts are generated by repeating processing for arbitrarily applying input images to image layout frames of the acquired template. At this time, the following parameters (image selection/layout/trimming references) are randomly determined. The image selection reference includes a reference as to which image is to be selected from the images when the layout includes N image layout frames. The layout reference includes a reference as to in which of layout frames a plurality of selected images are to be laid out. The trimming reference includes a reference about a trimming ratio indicating a degree of trimming processing to be executed when images are laid out. In this case, the trimming ratio is expressed by, for example, a value ranging from 0 to 100%, and a predetermined region is trimmed with reference to its center, as shown in FIG. 20. In FIG. 20, reference numeral 2301 denotes an entire image; and 2302, a trimming frame upon trimming at the trimming ratio=50%.

Based on the aforementioned image selection, layout, and trimming references, temporary layouts are generated as many as possible. Each generated temporary layout can also be expressed in a format such as XML data.

Note that the number L of temporary layouts to be generated is determined according to the processing amount of evaluation processing in a layout evaluation step to be described later, and the performance of the information processing apparatus 115 which executes that processing. For example, several hundred thousand different temporary layouts or more are prepared.

Next, in step S2108 in FIG. 18, the L temporary layouts generated by the above processing are evaluated respectively using predetermined layout evaluation amounts. FIG. 21 shows a list of layout evaluation amounts in this embodiment. As shown in FIG. 21, the layout evaluation amounts used in this embodiment can be mainly classified into three categories.

Figure 22:
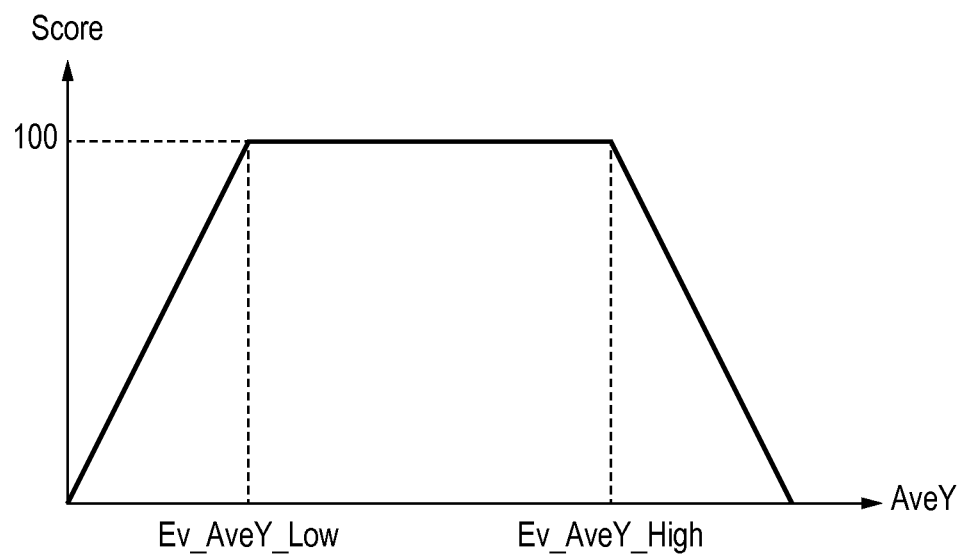
FIG. 22 is an explanatory view of a brightness adequate degree calculation method.
Figure 23:
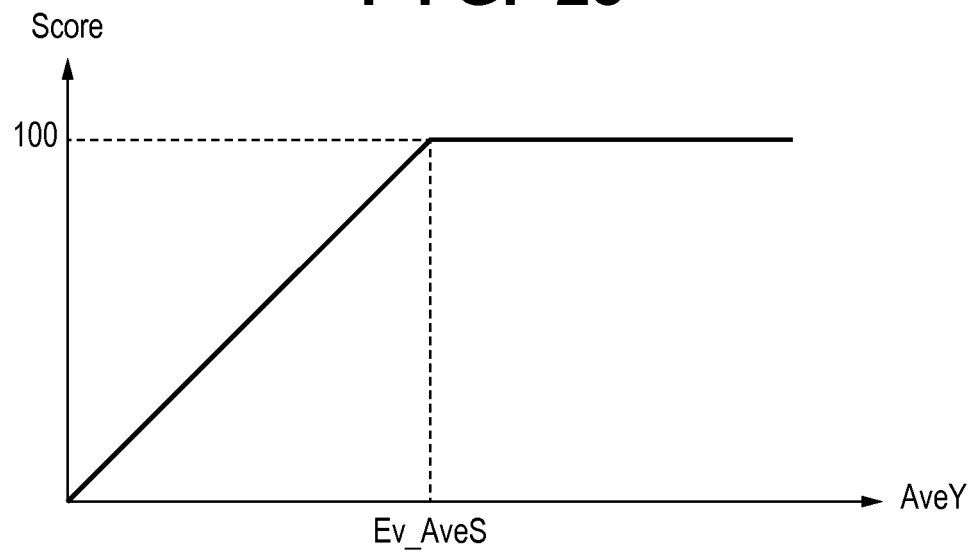
FIG. 23 is an explanatory view of a saturation adequate degree calculation method.

The first evaluation category includes image-dependent evaluation amounts. States such as a brightness, saturation, and blurred amount of an image are checked, and are converted into scores. Examples of scores will be described below. As shown in FIG. 22, a brightness adequate degree is set so that a score value=100 is given to an average luminance value within a predetermined range, and the score value is decreased when the luminance average deviates farther from the predetermined range. On the other hand, as shown in FIG. 23, a saturation adequate degree is set so that a score value=100 is given when an average saturation of an entire image is larger than a predetermined saturation value, and the score value is gradually degreased when the average saturation is smaller than the predetermined value.

The second evaluation category includes evaluation amounts of matching degrees between images and slots. Evaluation amounts of image/slot matching degrees include, for example, person matching degrees and trimming omission determination. The person matching degree expresses a matching ratio between a person designated for a given slot and a person included in an image actually laid out in that slot. For example, assume that "father" and "son" are designated for a certain slot. At this time, assuming that the above two persons are included in an image assigned to that slot, a person matching degree of this slot assumes a score value=100. If only one person is included, a matching degree assumes a score value=50. If none of the persons are included, a score value=0 is set. A matching degree in a page assumes an average value of matching degrees calculated for respective slots.

Figures 24, 25:
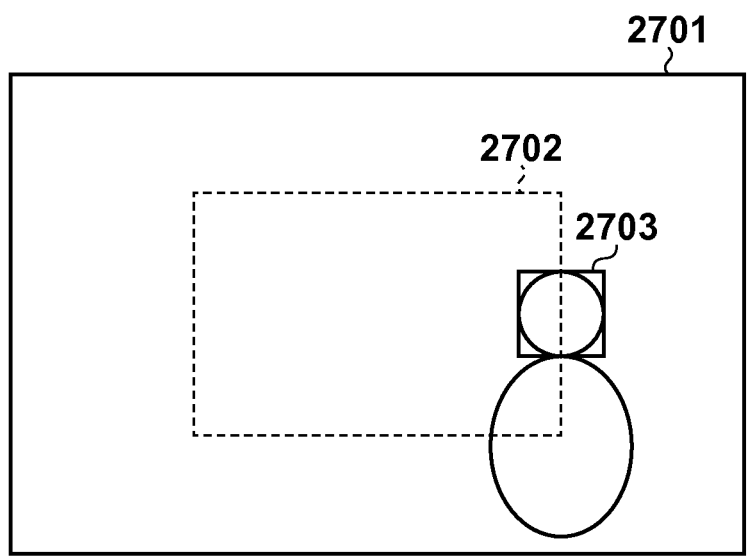
FIG. 24 is an explanatory view of trimming omission determination processing.
FIG. 25 is an explanatory view of image similarity determination processing.

As another image/slot matching degree evaluation value, omission determination of a trimming region 2702 can be used. For example, when a position 2703 of a face included in an image is revealed, as shown in FIG. 24, a score value ranging from 0 to 100 is calculated according to an area of an omitted portion. When an omitted area is 0, a score value is 100; conversely, when a face region is fully omitted, a score value is 0.

The third evaluation category includes evaluation amounts of a balance in a layout page. FIG. 21 presents an image similarity, tincture variation, and face size variation as evaluation values used to evaluate a balance.

The image similarity will be described first. Similarities of respective images are calculated for respective temporary layouts generated in large quantities. For example, when a layout having a theme "travel" is to be created, if only images having higher similarities, that is, only those which are similar to each other, are laid out, this layout is not good. For example, similarities can be evaluated based on captured dates and times. Images having close captured dates and times were more likely to be captured at similar places. However, when captured dates and times are largely different, places and scenes are more likely to be different. The captured dates and times can be acquired from pieces of attribute information for respective images, which are stored in advance in the database 202 as image attribute information, as shown in FIG. 11. Similarities are calculated from the captured dates and times by the following calculations. For example, assume that four images shown in FIG. 25 are laid out on a temporary layout of interest. Note that in FIG. 25, an image specified by an image ID is appended with captured date/time information. More specifically, as the captured date/time information, a year, month, and day, and a time (year: YYYY, month: MM, day: DD, hour: HH, minute: MM, second: SS) are appended. At this time, among these four images, a shortest captured time interval value is calculated. In this case, 30 min between images with image IDs=102 and 108 correspond to the shortest interval. Letting MinInterval be this interval, and the interval is stored in a second unit. That is, 30 min=1800 sec. This MinInterval is calculated for each of the L temporary layouts, and is stored in a sequence stMinInterval[l]. Next, a maximum value MaxMinInterval of the stMinInterval[l] is calculated. Then, a similarity evaluation value Similarity[l] of an l-th temporary layout can be calculated by:

$$\text{Similarity}[l]=100\times \text{stMinInterval}[l]/\text{MaxMinInterval}$$

That is, the Similarity[l] is effective as an image similarity evaluation value since it assumes a value which becomes closer to 100 as a minimum captured time interval is larger, and that which becomes closer to 0 as the interval is smaller.

Next, as an evaluation value used to evaluate a balance in a layout page, a tincture variation will be described below. For example, when a layout having a theme "travel" is to be created, if only images having similar colors (for example, blue of blue sky and green of mountains) are laid out, that layout is not good. In this case, large tincture variations are set. Note that variances of average hues AveH of images included in an l-th temporary layout of interest are calculated, and are stored as a tincture variation degree tmpColorVariance[l]. Next, a maximum value MaxColorVariance of the tmpColorVariance[l] is calculated. Then, a tincture variation evaluation value ColorVariance[l] of the l-th temporary layout can be calculated by:

$$\text{ColorVariance}[l]=100\times \text{tmpColorVariance}[l]/\text{MaxColorVariance}$$

That is, the ColorVariance[l] is effective as a tincture variation degree evaluation value since it assumes a value which becomes closer to 100 as variations of the average hues of images laid out in a page are larger, and that which becomes closer to 0 as the variations are smaller.

Next, as an evaluation value used to evaluate a balance in a layout page, a variation degree of face sizes will be described below. For example, when a layout having a theme "travel" is to be created, if only images having similar face sizes are laid out by checking a layout result, that layout is not good. On a good layout, images having both small and large face sizes are laid out on a sheet surface after layout to have a good balance. To attain such layout, large face size variations are set. In this case, variance values of face sizes (each of which is expressed by a distance of a diagonal line from an upper left position to a lower right position of a face region) of images laid out in an l-th temporary layout of interest are stored as tmpFaceVariance[l]. Next, a maximum value MaxFaceVariance of the tmpFaceVariance[l] is calculated. Then, a face size variation degree evaluation value FaceVariance[l] of the l-th temporary layout can be calculated by:

$$\text{FaceVariance}[l]=100\times \text{tmpFaceVariance}[l]/\text{MaxFaceVariance}$$

That is, the FaceVariance[l] is effective as a face size variation degree evaluation value since it assumes a value which becomes closer to 100 as variations of face sizes laid out on a sheet surface are larger, and that which becomes closer to 0 as the variations are smaller.

As another category, user's preference evaluation may be used.

The plurality of evaluation values, which are calculated for each temporary layout, as described above, are integrated to obtain a layout evaluation value of that temporary layout. Let EvalLayout[l] be an integrated evaluation value of an l-th temporary layout, and EvalValue[n] be N evaluation values (respectively including evaluation values shown in FIG. 21), which are calculated, as described above. At this time, the integrated evaluation value can be calculated by:

$$\text{EvalLayout}[l]=\Sigma\{\text{EvalValue}[n]\times W[n]\}$$

where $\Sigma$ is an integral calculation symbol of n=0, 1, 2, ..., N. Also, W[n] is a weight of each evaluation value for respective scenes shown in FIG. 21. The weights are characterized by setting different weights depending on themes of layouts. For example, as shown in FIG. 21, upon comparison between themes "growth" and "travel", many photos of various scenes, which photos have higher qualities as much as possible, are desirably laid out for the theme "travel". For this reason, this theme is set to have a tendency that attaches importance on image-dependent evaluation values and balance evaluation values in a page. On the other hand, whether or not a main character as a growth record target surely matches slots is more important for the theme "growth" than variations of images. For this reason, this theme is set to have a tendency that attaches more importance on image/slot matching degree evaluation values than a balance in a page and image-dependent evaluation values.

Using the EvalLayout[l] calculated in this way, a layout list LayoutList[k] used to display layout results is generated in step S2109. The layout list stores identifiers l in descending order of evaluation value of the EvalLayout[l] for the predetermined number of (for example, five) layouts. For example, when a temporary layout corresponding to the highest score is a 50th (=l) temporary layout, LayoutList[0]=50. Likewise, after LayoutList[1], identifiers l of layouts having the second and subsequent score values are stored.

Next, the layout results obtained by the layout generation processing are displayed. In this embodiment, the layout results are rendered in step S605 in FIG. 6, and the rendered results are displayed and proposed within a UI 2901 shown in FIG. 26. In step S605, a layout identifier stored in LayoutList[0] is read out, and a temporary layout result corresponding to that identifier is read out from the secondary storage device or RAM. The layout result is set with template information and image names assigned to respective slots included in the template, as described above. In step S605, the layout result is rendered using a rendering function of an OS, which runs on the information processing apparatus 115, based on these pieces of information, and is displayed to be popped up like a layout frame 2902 in FIG. 26.

When the user presses a Next button 2904 in FIG. 26, an identifier stored in LayoutList[1] as the next highest score is read out, and a corresponding layout result is rendered and displayed in the same manner as described above. Thus, the user can browse proposal layouts of various variations. When the user presses a Previous button 2903, a previously displayed layout is re-displayed. Furthermore, when the user likes the displayed layout, he or she can press a print button 2905 to print out the layout result from the printer 112 connected to the information processing apparatus 115.

The face dictionary generation processing corresponding to step S512 of FIG. 5 in the aforementioned embodiment will be described below.

Figure 27:
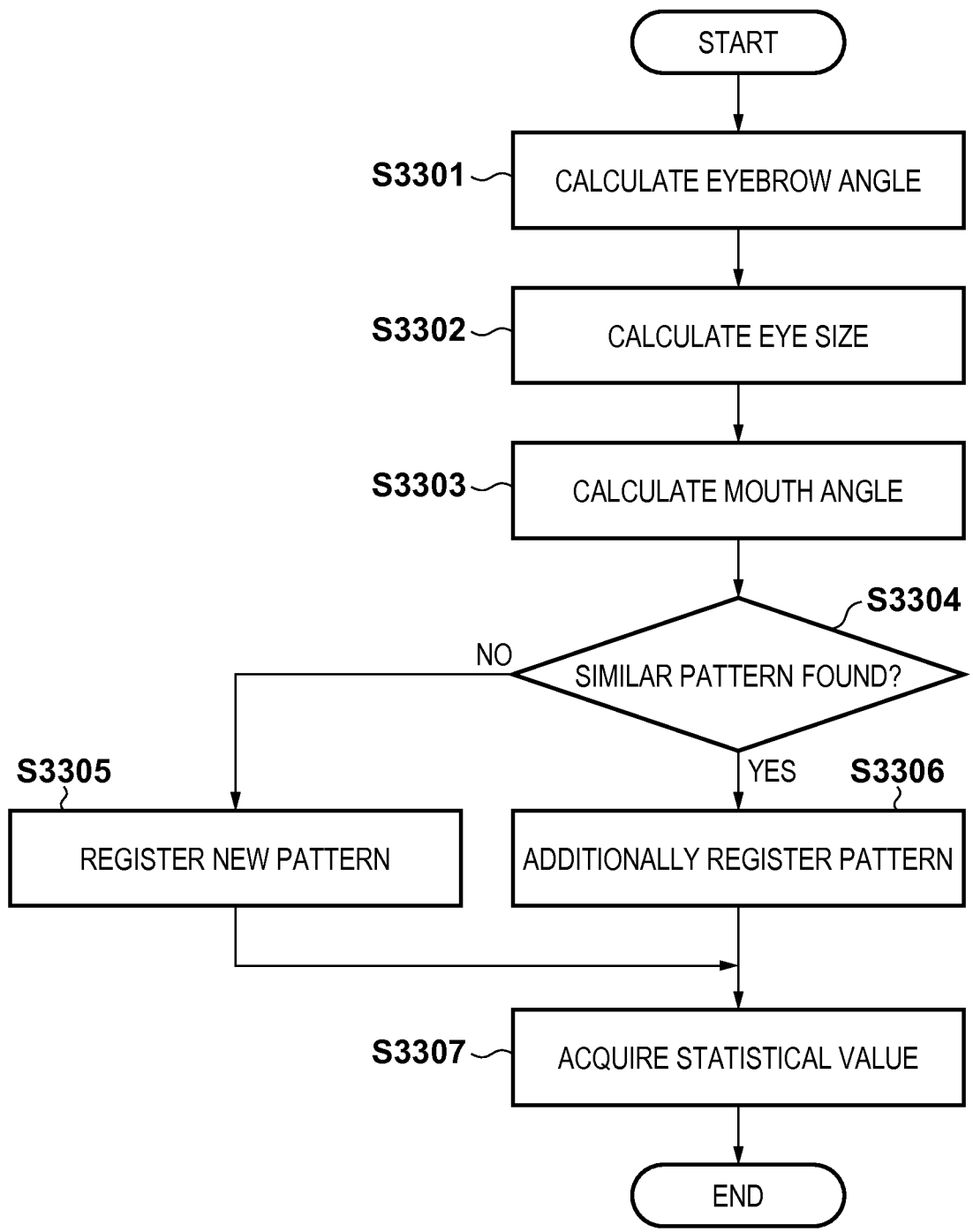
FIG. 27 is a flowchart of face dictionary generation processing according to the first embodiment.

FIG. 27 is a flowchart of the face dictionary generation processing in step S512. This embodiment will exemplify an eyebrow angle, eye size, and mouth angle as determination based on parts which configure a face, for the sake of simplicity. However, the present invention is not limited to this. For example, determination may be made using more parts, or other parts.

In steps S3301 to S3303, an eyebrow angle $B\theta$, eye size ES, and mouth angle $M\theta$ (they will be referred to as feature amount elements hereinafter for the sake of convenience) are respectively calculated.

In step S3301, an eyebrow angle is calculated. For example, an eyebrow angle is a tilt from a horizontal line when two end portions are coupled via a line. Right and left eyebrow angles may be independently acquired. However, in this embodiment, an average of the right and left eyebrow angles is calculated as an eyebrow angle. In step S3302, an eye size is calculated. As for an eye size, a length of each eye in a horizontal direction and a height in a vertical direction may be calculated independently for right and left eyes. However, in this embodiment, an average value of the heights in the vertical direction of the right and left eyes is calculated. In step S3303, as a mouth angle, a tilt from a horizontal line is calculated in the same manner as the eyebrow angle. The mouth angle may be calculated using a maximum angle or approximate curve since the mouth is located at the center of a face and an inflection point is often set.

It is determined in step S3304 whether or not feature information pattern such as feature amount patterns registered in a face dictionary include a similar pattern. That is, whether or not a combination of the calculated $B\theta$, ES, and $M\theta$ (to be referred to as a feature amount pattern hereinafter) is already included in the face dictionary is judged. At this time, whether or not the calculated eyebrow angle $B\theta$, eye size ES, and mouth angle $M\theta$ fall within predetermined ranges with respect to average values $B\theta_{Ave}$, $ES_{Ave}$, and $M\theta_{Ave}$ of respective feature amount elements of feature amount patterns already stored in the face dictionary is determined. If these ranges are respectively defined as $B\theta_{Width}$, $ES_{Width}$, and $M\theta_{Width}$, the following evaluations can be made.

$$(B\theta_{Ave}-B\theta_{Width})<B\theta<(B\theta_{Ave}+B\theta_{Width}) \text{ and}$$

$$(ES_{Ave}-ES_{Width})<ES<(ES_{Ave}+ES_{Width}) \text{ and}$$

$$(M\theta_{Ave}-M\theta_{Width})<M\theta<(M\theta_{Ave}+M\theta_{Width})$$

If no similar pattern is found, the feature amount pattern of interest is registered as a new feature amount pattern (new person) in the face dictionary in step S3305. If a similar pattern is found, it is determined in step S3306 that the found pattern is the same as the feature amount pattern of interest, and the feature amount pattern of interest is additionally registered as a new feature amount pattern of a person determined as the similar person.

In step S3307, in the new or added feature amount pattern, statistical values of respective feature amount elements are generated or updated. As an example of a statistical value, a variance value may be used in addition to an average value used in step S3304.

With the aforementioned processing, addition and updating of the face dictionary are repeated, and if it is judged in step S511 that the processing is complete for all images, the face dictionary is generated based on existing images.

Figure 28:
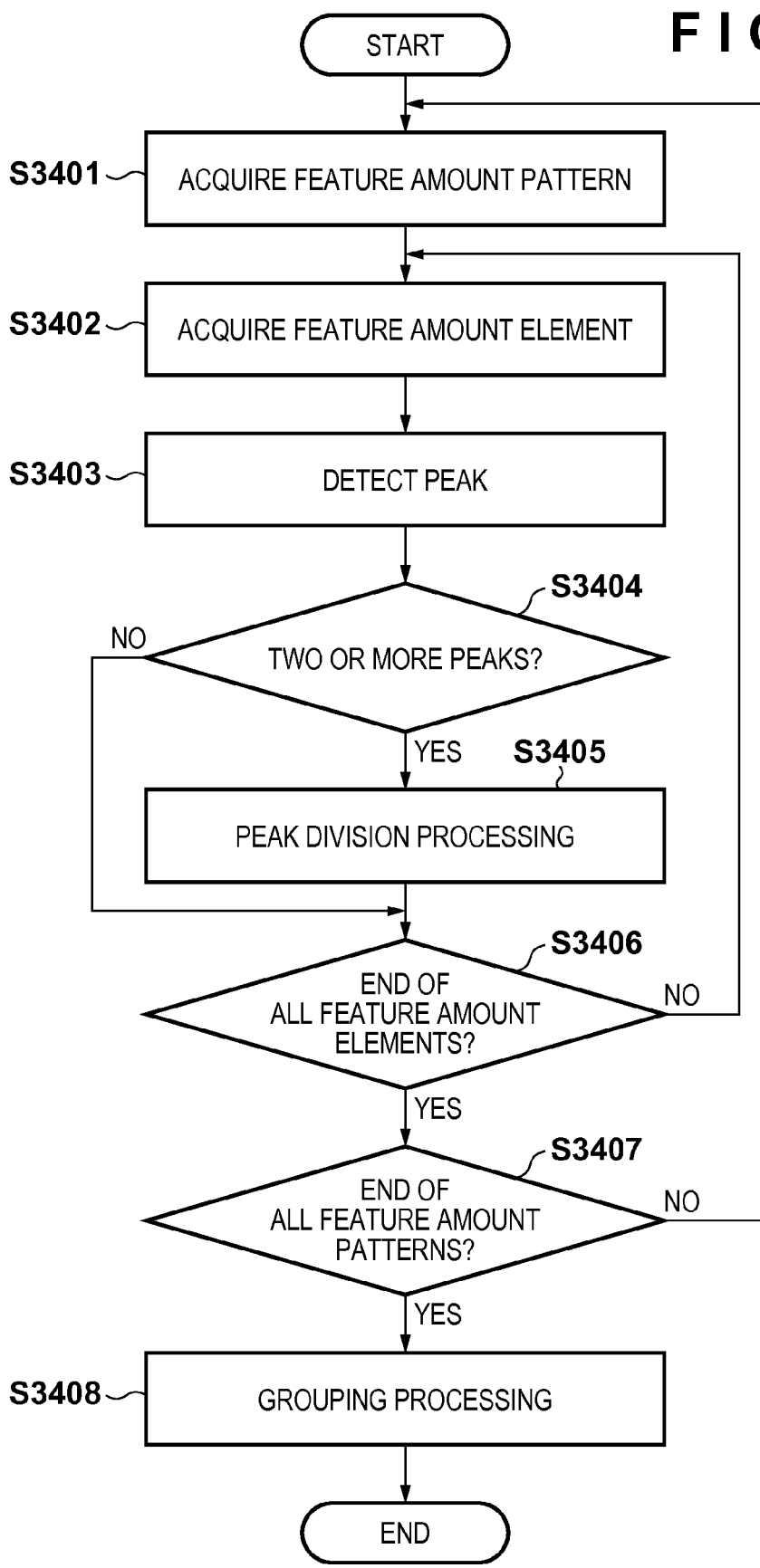
FIG. 28 is a flowchart of segmentation processing according to the first embodiment.

The segmented group generation processing in step S513 will be described below. In this step, since feature amounts which belong to one group (for example, a person "Taro") in the face dictionary are further segmented, the current dictionary is modified to that which allows more flexible determination. FIG. 28 is a flowchart of the segmented group generation processing. Assume that the segmented group generation processing is executed when the number of faces which are determined as that of the corresponding person becomes not less than a pre-set value.

In step S3401, feature amount patterns of feature amounts of images determined as a target person "Taro" are acquired. Note that the following description will be given under the assumption that each feature amount pattern includes feature amount elements, that is, an eyebrow angle, eye size, and mouth angle, as in the above description.

Figure 29A:
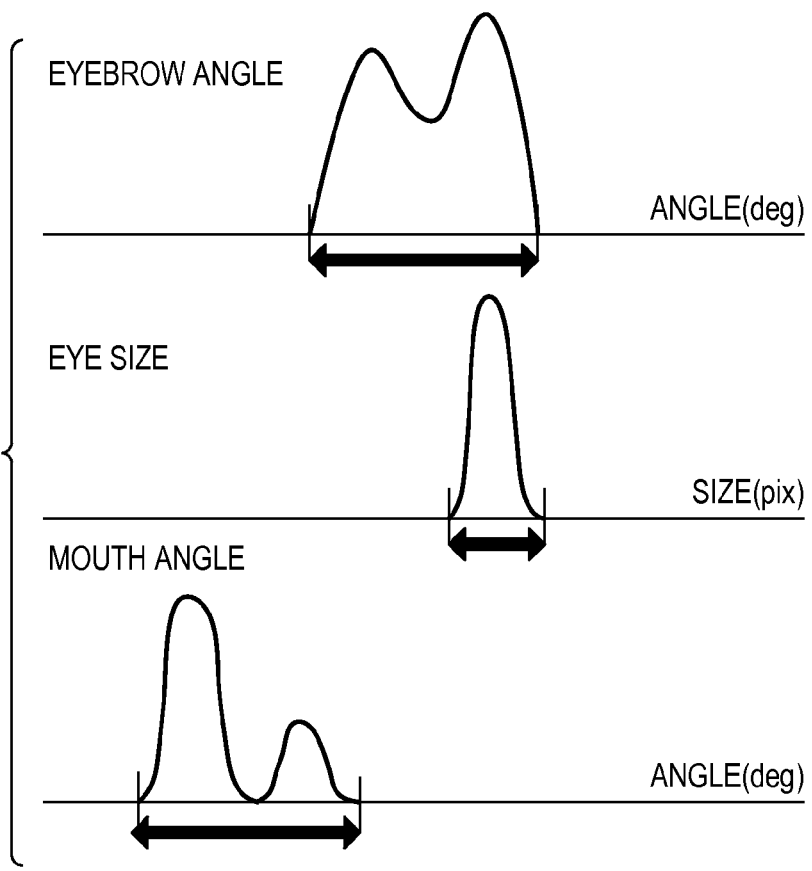
FIGS. 29A and 29B are views showing an example of feature amount element segmentation processing according to the first embodiment.

In step S3402, one feature amount element is acquired. Then, peak detection of the target feature amount element is executed in step S3403. FIG. 29A shows an example of a certain feature amount pattern. The abscissa plots a feature amount, and an arrow indicates an existence range of that feature amount. The ordinate plots a frequency.

When an eyebrow angle is acquired as the target feature amount element in step S3402, two peaks are detected in FIG. 29A. Some methods are available for the peak detection. In this case, assume that an inflection point (in this case, an upward convex inflection point) is detected using differential processing. Note that when detection errors occur due to local irregularity, it is effective to use smoothing processing and an approximate curve together. Two peaks are detected within a feature amount range indicating an eyebrow angle in FIG. 29B. Upon application of the same processing, one peak and two peaks are respectively detected in an eye size range and mouth angle range in FIG. 29A.

Whether or not a plurality of peaks are detected for a part of interest, that is, whether or not the part of interest can be segmented is determined in step S3404.

Figure 29B:
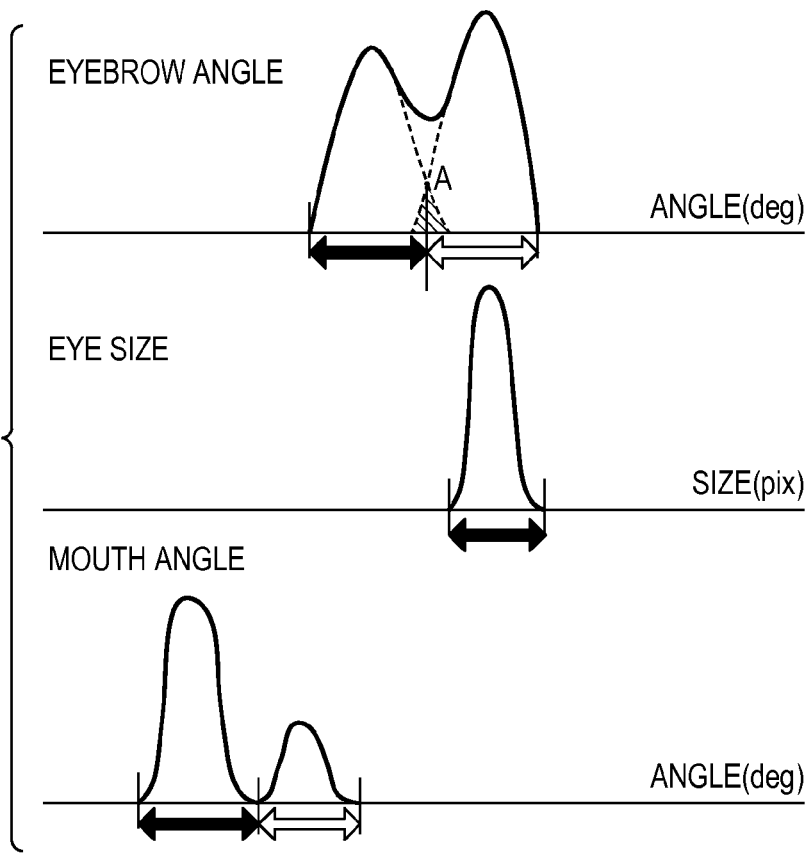

If two or more peaks are detected, the process advances to step S3405, and processing for dividing the feature amount existence range into two or more small ranges (peak division processing) is executed. After that, the process advances to step S3406. The division method may consider a normal distribution having a peak value as the center, or an estimation method based on an actual half maximum full-width may be used. In this embodiment, the feature amount existence range is divided, as shown in FIG. 29B.

On the other hand, if one peak or less is detected in step S3404, the current feature amount range is maintained without executing peak division, and the process jumps to step S3406.

It is determined in step S3406 whether or not the processes of steps S3403 to S3405 are complete for all feature amount elements. If the processes are complete, the process advances to step S3407; otherwise, the process returns to step S3402. It is determined in step S3407 whether or not the processes of steps S3402 to S3406 are complete for all feature amount patterns. If the processes are complete, the process advances to step S3408; otherwise, the process returns to step S3401.

In step S3408, based on the peaks divided in step S3405, grouping is redone. A single feature amount element in FIG. 29A is divided, as shown in FIG. 29B, after this processing, and the face dictionary is changed based on this. In the example of FIG. 29B, the feature amount pattern in FIG. 29A is divided. That is, in FIG. 29B, the eyebrow angle is divided into two types (arrow colors: black and white), the eye size is left unchanged as one type (arrow color: black), and the mouth angle is divided into two types (arrow colors: black and white). Therefore, after the division processing, 4 (=2×1×2) different feature amount patterns are obtained as follows.

Feature amount pattern 1: eyebrow (black)×eye (black)×mouth (black)

Feature amount pattern 2: eyebrow (black)×eye (black)×mouth (white)

Feature amount pattern 3: eyebrow (white)×eye (black)×mouth (black)

Feature amount pattern 4: eyebrow (white)×eye (black)×mouth (white)

Note that the eyebrow angle patterns in FIG. 29B include an overlapping region (hatched portion in FIG. 29B) when estimation is executed using a normal distribution or the like. In this case, to which of patterns an image included in the overlapping region is distributed poses a problem. In this embodiment, an intersection A of the two peaks is calculated, and segmentation is executed to have an angle $M\theta_A$ corresponding to the intersection A as a boundary. In this manner, a dictionary having sensitivity to a fine change of an image can be generated. For example, the feature amount pattern 1 serves as a dictionary having detection sensitivity to a face with a big smile, and the feature amount pattern 2 serves as a dictionary having detection sensitivity to a face with a little smile.

Furthermore, in this embodiment, frequencies of occurrence for respective feature amount patterns (patterns 1 to 4) obtained by the above processing are counted, and a pattern with the small frequency of occurrence is excluded. FIG. 37 is a flowchart of this processing. In step S4301, a target feature amount pattern is acquired. In step S4302, a frequency of occurrence of that pattern (in this case, an appearance count in images) is measured. In step S4303, the frequency of occurrence is compared with a predetermined value. If the frequency of occurrence is less than the predetermined value, the process advances to step S4304; otherwise, the process advances to step S4305. In step S4304, the corresponding pattern is deleted since it does not satisfy a predetermined criterion. At this time, the pattern not more than the predetermined value is excluded from those for personal identification. At this time, patterns of a combination which cannot be taken are excluded from those for personal identification. This processing is executed for all segmented feature amount patterns. It is determined in step S4305 whether or not processing is complete for all feature amount patterns. If the processing is not complete yet, the process returns to step S4301; otherwise, the processing ends. Thus, possible combinations of respective parts are defined, and actually inconceivable combinations (for example, smiling eyes and an angry mouth) are excluded, and the dictionary is updated by patterns with high frequencies of occurrence, thereby improving the precision of the dictionary, that is, that of personal identification (to allow precise dictionary management).

Also, such processing is effective to distinguish different persons having similar faces (for example, brothers or sisters, a parent and child, and the like: persons who have similar eyebrow and mouth angles but slightly different eye sizes) in addition to expressions.

Note that changes of faces can include those with accessories (for example, eyeglasses). The eye size may change due to the influence of a lens. In this case, such pattern is registered in the dictionary as an independent feature amount pattern to have detection performance.

Figure 30:
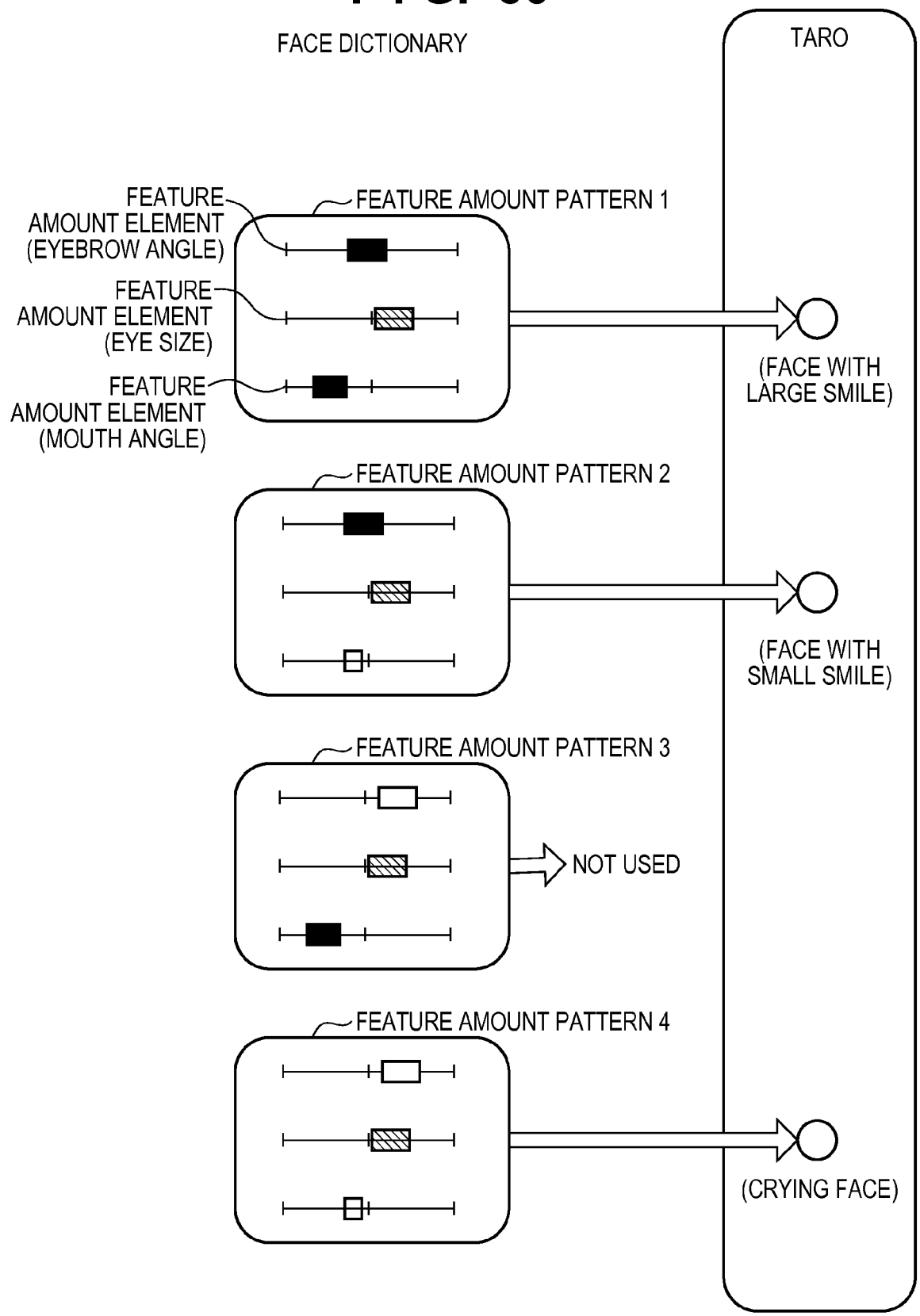
FIG. 30 is a view showing an example of personal recognition processing according to the first embodiment.

As a result of the above processing, for example a face dictionary required to identify a person "Taro" is built, as shown in FIG. 30. As shown in FIG. 30, it is determined that "Taro" is identified using feature amount patterns 1, 2, and 4, and a feature amount pattern 3 is not used to identify "Taro". Not to use a pattern means that even when another person happens to have a face having the feature amount pattern 3, that person is prevented from being erroneously identified as "Taro". Even if another person has a face with feature amount pattern 3, the other person is not erroneously identified as Taro. That is, a probability of erroneous determination of the other person as "Taro" can be reduced, and the face identification precision can be improved.

Using the aforementioned face dictionary, personal identification of a newly input image is executed. In this case, the face dictionary is modified as needed to improve the personal identification precision. This is because the number of images used to generate an initial face dictionary is not always the sufficient number of samples. On the other hand, a sufficiently optimal face dictionary may be modified to cause a precision drop. In consideration of them, the dictionary is updated by the following processing.

Figure 31:
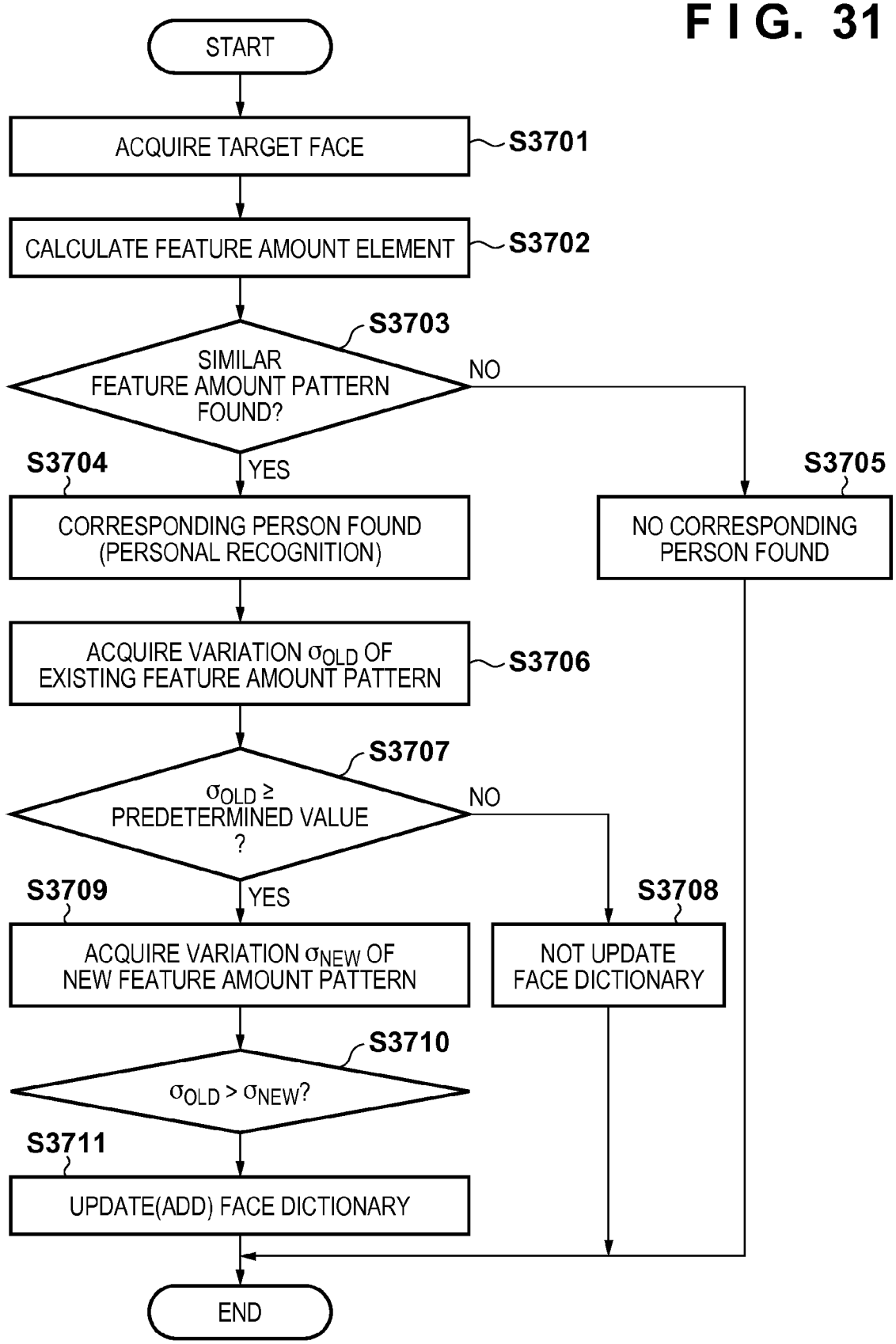
FIG. 31 is a flowchart of personal recognition processing and face dictionary updating processing according to the first embodiment.

FIG. 31 is a flowchart of personal identification processing of a face included in a newly input image and face dictionary update processing.

In step S3701, a target face image is acquired. Assume that this face image has already undergone normalization processing as that described in step S504.

In step S3702, an eyebrow angle B$\theta$, eye size ES, and mouth angle M$\theta$ as feature amount elements are calculated from the image acquired in step S3701.

It is determined in step S3703 with reference to feature amount patterns registered in the face dictionary whether or not a similar pattern is found. The same determination as in the process of step S3304 in FIG. 27 may be executed. However, in this step, predetermined ranges B$\theta_{Width2}$, ES$_{Width2}$, and M$\theta_{Width2}$ (all these ranges assume positive values) to be set in advance desirably assume smaller values than those of step S3304. This is because the segmented group generation processing has already been executed, and feature amount elements included in each feature amount pattern have smaller widths.

$$(B\theta_{Ave}-B\theta_{Width2})<B\theta<(B\theta_{Ave}+B\theta_{Width2}) \text{ and}$$

$$(ES_{Ave}-ES_{Width2})<ES<(ES_{Ave}+ES_{Width2}) \text{ and}$$

$$(M\theta_{Ave}-M\theta_{Width2})<M\theta<(M\theta_{Ave}+M\theta_{Width2})$$

The determination under the aforementioned conditions is executed, and if a similar pattern is found, the process advances to step S3704; otherwise, the process advances to step S3705. In step S3704, a name linked (associated) with the feature amount pattern is specified, thus executing personal recognition of the target face.

Since the corresponding face (person) is not found in step S3705, the processing ends.

After the personal recognition is executed in step S3704, the process advances to the dictionary update processing. In step S3706, statistical values of the target feature amount pattern are acquired. Of these statistical values, a variance value $\sigma_{OLD}$ indicating a variation is focused.

It is determined in step S3707 whether or not an existing variance value $\sigma_{OLD}$ is not less than a predetermined value, which is set in advance. If the existing variance value $\sigma_{OLD}$ is less than the predetermined value, that is, if that variance value assumes a sufficiently small value, it is judged that the feature amount pattern has a sufficiently high precision, and the process advances to step S3708. In this case, the face dictionary is not updated.

On the other hand, if the existing variance value $\sigma_{OLD}$ is not less than the predetermined value, it is judged that the number of samples does not suffice to form a feature amount pattern, and the process advances to step S3709.

In step S3709, a statistical amount when the feature amount pattern of the target face is added is calculated. Let $\sigma_{NEW}$ be a newly calculated variance value.

In step S3710, $\sigma_{OLD}$ and $\sigma_{NEW}$ are compared. If $\sigma_{NEW}$ is smaller, that is, a variation becomes smaller after addition, the process advances to step S3711, and the feature amount pattern is added to the face dictionary. If a variation does not become smaller, the process advances to step S3708, and the face dictionary is not updated.

In this embodiment, the personal recognition precision using the face dictionary can be improved. For example, sufficiently high precision can be attained for images having different expressions in the personal recognition processing of faces in digital images. Note that different expressions include changes by accessories such as eyeglasses. As described above, by updating the face dictionary if it is necessary simultaneously with execution of the personal recognition, a face dictionary learning function can be provided. With the processing using the dictionary according to this embodiment, when a collage image to be proposed is generated, even images with expressions similar to those of existing images can be personally recognized. In this manner, since wrong personal recognition can be suppressed, an appropriate collage image can be proposed. Note that in this embodiment, a feature amount is segmented by dividing peaks. However, the present invention is not limited to such specific method as long as a feature amount can be segmented.

The first embodiment has exemplified an eyebrow angle, eye size, and mouth angle as feature amount elements which form a feature amount pattern. By contrast, this embodiment will exemplify a case in which a time is adopted as one element of a pattern required for personal identification. Since this embodiment is the same as the first embodiment except for a dictionary, a description of the same parts as in the first embodiment will not be repeated.

When a time element is adopted as one element of a pattern required for personal identification, each image and its captured date and time are required to be linked. In this embodiment, since each image is stored and managed using attribute information shown in FIG. 11, its captured time can be obtained from a tag "CaptureDateTime" in the description of FIG. 11.

Figure 32:
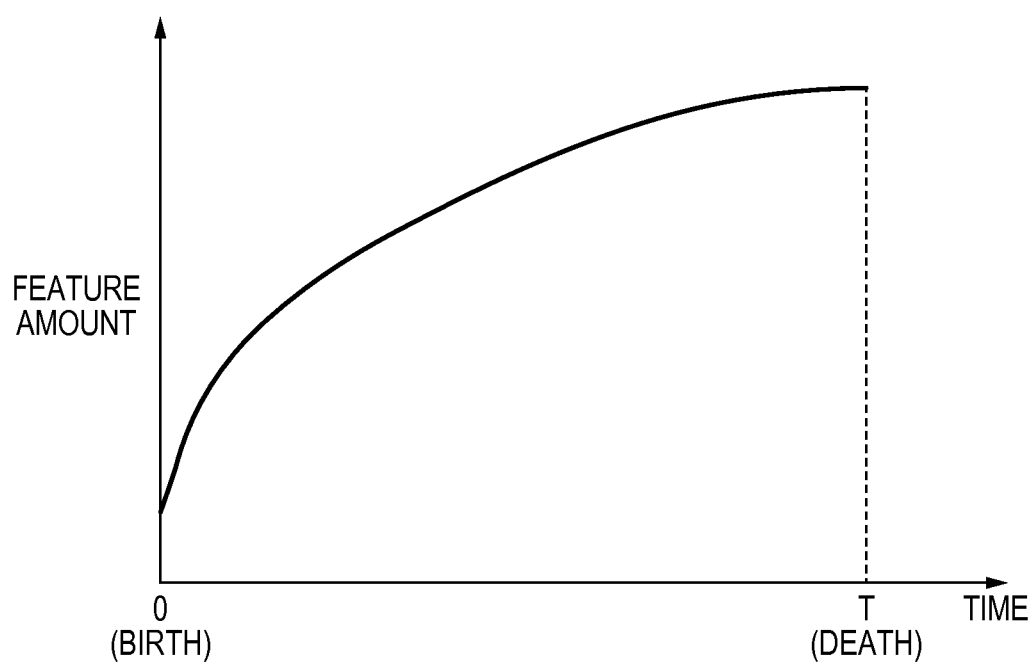
FIG. 32 is a graph showing an image of a change in human feature amount.

FIG. 32 is a graph showing a degree of change of a face of a person. The ordinate is an axis which plots a certain feature amount, and the abscissa is a time axis. As shown in FIG. 32, a human face begins to change since birth, and is always changing until death. Therefore, in this embodiment, an element, that is, a change caused by aging, is added to segment a face dictionary.

The first embodiment has explained detection of a variety of expressions using segmented feature amount patterns. In this embodiment, the element, that is, the change caused by aging is added to further segment feature amount patterns, thereby improving personal recognition precision.

Figure 35:
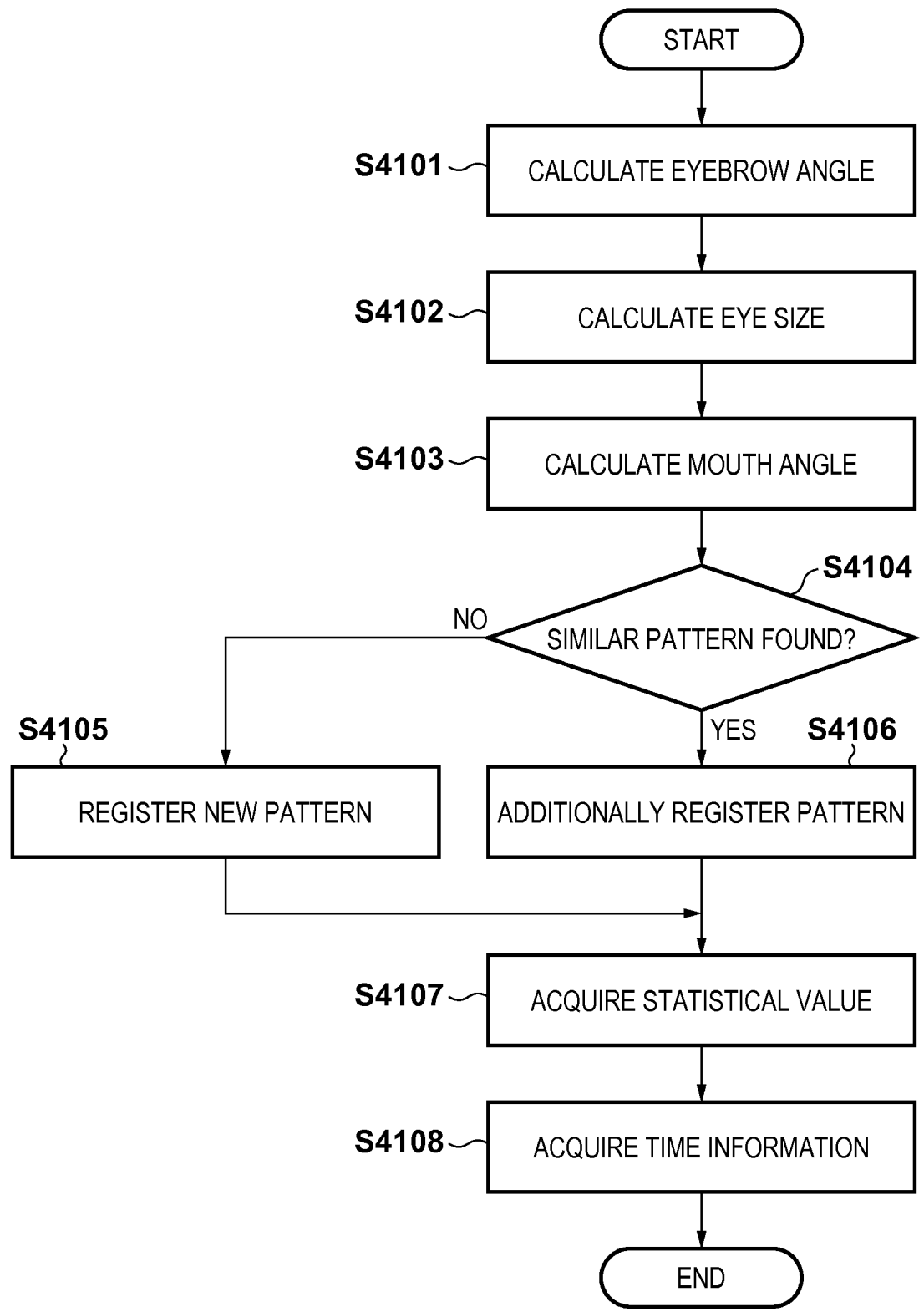
FIG. 35 is a flowchart of face dictionary generation processing according to the second embodiment.

FIG. 35 shows the processing sequence associated with generation of a face dictionary. Note that steps S4101 to S4107 are the same as steps S3301 to S3307 in FIG. 27, and a description thereof will not be repeated.

In step S4108, after feature amount elements of an image are added to a dictionary in step S4106, time information of that image is acquired. The time information can be acquired with reference to a captured date and time of metadata (for example, Exif data) appended to an image file. If no metadata is included, the time information can be obtained by referring to a date and time of creation of the file.

Although Exif information of an image file describes a detailed captured date and time including a second unit, the processing of this embodiment does not require such detailed information, and time information having only day, month, and year units may be acquired. In consideration of a change ratio which is larger in early childhood and is decreasing with age, as shown in a face change of FIG. 32, a unit of time information to be acquired may be switched according to an age of a target person.

When a profile such as an age and name cannot be acquired at the first detection timing, a predetermined period may be used.

The sequence of segmented group generation processing of a face dictionary is the same as that shown in FIG. 28 of the first embodiment, except that grouping processing in step S3408 is executed using the acquired time information. This processing will be additionally described below.

Figure 33:
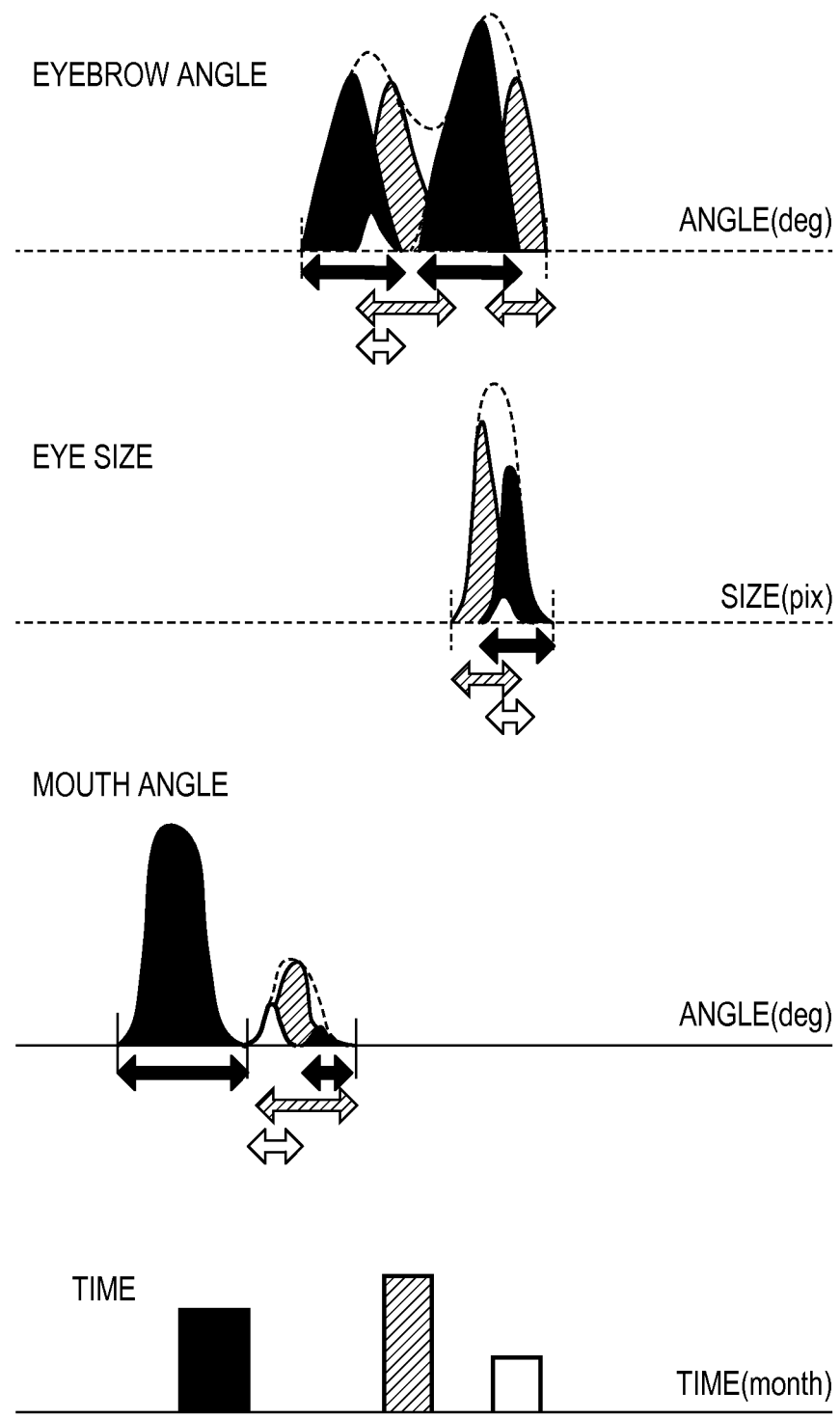
FIG. 33 is a view showing an example of feature amount element segmentation processing according to the second embodiment.

FIG. 33 shows feature amount elements of this embodiment. In addition to feature amount elements, that is, an eyebrow angle, eye size, and mouth size shown in FIGS. 29A and 29B of the first embodiment, a time feature amount element is added (FIG. 33). In case of the time feature amount element, after imaging operations for a predetermined period, imaging operations may often be made after a while. The time feature amount elements are not always distributed in a normal distribution. In consideration of such fact, first and last dates and times of a predetermined period such as a day, month, or year described above may be determined.

Grouping processing is executed for separated feature amount elements further in consideration of a time element. In FIG. 33, a time as a feature amount element is expressed by three time ranges of black, hatching, and white.

Respective peak portions are obtained by applying this time element to other feature amount elements. For example, an eyebrow angle is divided into two elements by segmentation by means of peak detection, and the two elements are further segmented into five elements in consideration of the time element (black: 2, hatching: 2, white: 1). Likewise, an eye size and mouth angle are respectively segmented to three elements (black: 1, hatching: 1, white: 1) and four elements (black: 2, hatching: 1, white: 1). As a face dictionary, since identical time elements are multiplied and registered, a feature amount pattern is classified into a total of seven feature amount patterns:

Black: 2×1×2=4

Hatching: 2×1×1=2

White: 1×1×1=1

After that, inconceivable combinations are included based on their frequencies of occurrence, as described in the first embodiment using FIG. 37.

Figure 34:
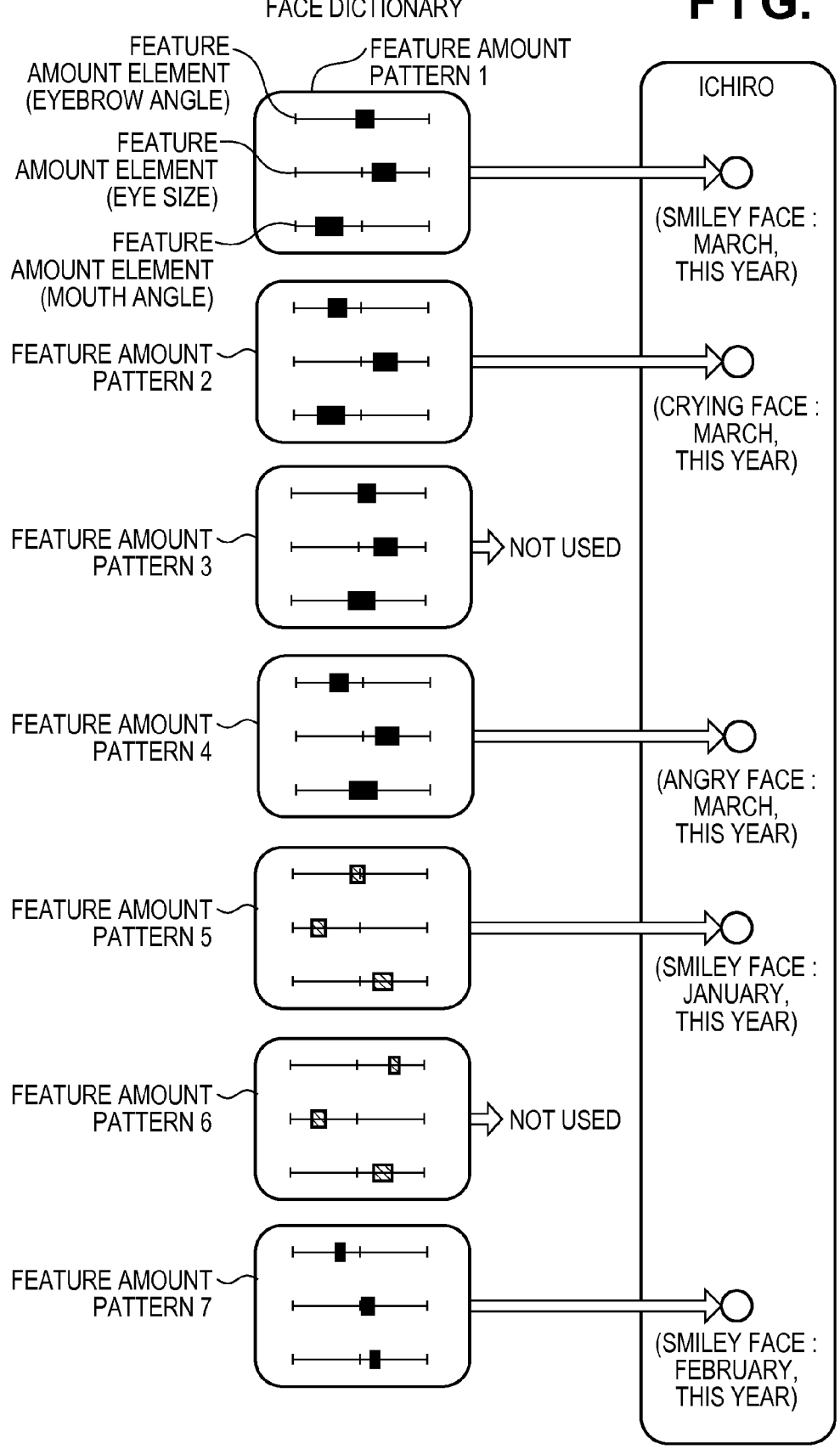
FIG. 34 is a view showing an example of personal recognition processing according to the second embodiment.

After execution of the aforementioned processing, a face dictionary shown in FIG. 34 is configured. That is, of seven feature amount patterns, feature amount patterns 1, 2, 4, 5, and 7 are used to identify "Ichiro", and remaining feature amount patterns 3 and 6 are not used to identify "Ichiro".

A method of executing personal recognition of a newly input image using the face dictionary which is generated by the above processing in consideration of a time will be described below. As in the first embodiment, simultaneously with the personal recognition, the dictionary is updated based on the recognition result. Since the processing sequence is the same as that shown in FIG. 31, a description thereof will not be repeated.

In this case, as one of dictionary update methods, capacity optimization processing of the face dictionary will be described. In the system of this embodiment, face dictionary data is stored in a secondary storage device 103 in FIG. 1. Since the secondary storage device 103 generally has a finite area, the dictionary data to be stored has to be suppressed to a limited capacity. That is, when a predetermined capacity is exceeded, processing for deleting certain data registered in the database to suppress the capacity is required.

Figure 36:
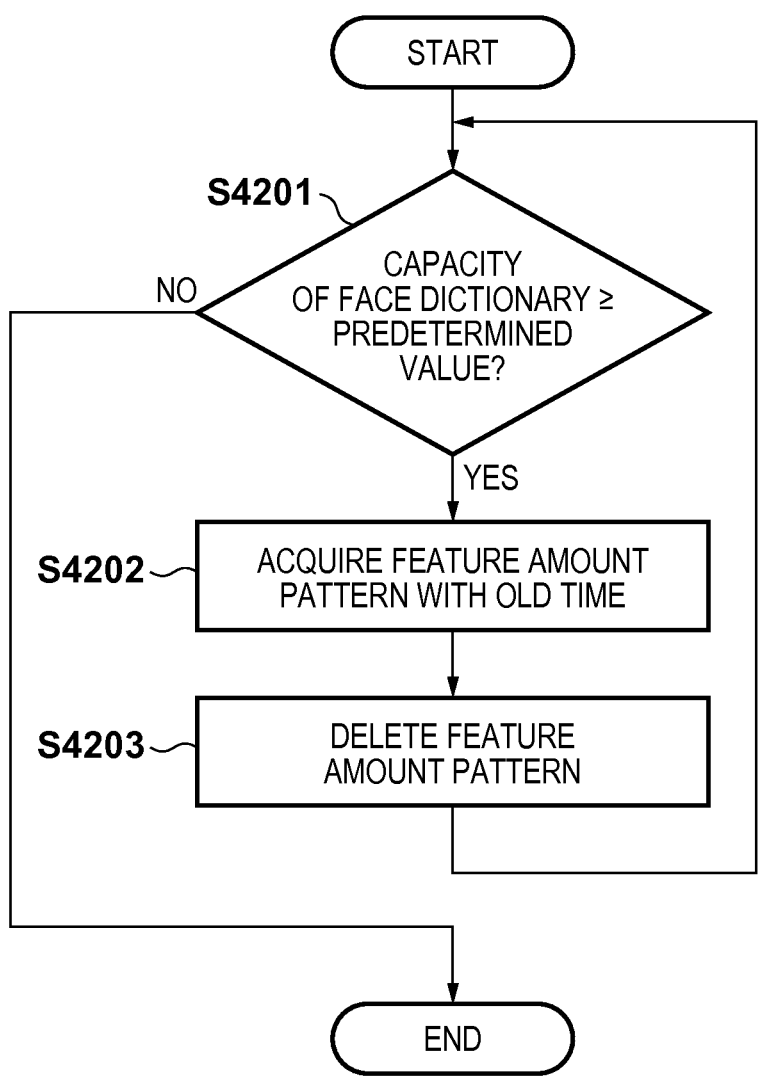
FIG. 36 is a flowchart of face dictionary reduction processing according to the second embodiment.

FIG. 36 shows the processing sequence as an example of capacity suppressing processing. In step S4201, determination processing as to whether or not the capacity of a face dictionary database reaches a predetermined value is executed. In this determination processing, if it is determined that the capacity does not reach the predetermined value, that is, a sufficient free space for the capacity is still available, the processing ends without any processing. If it is determined that the capacity reaches the predetermined value, and data deletion is required, the process advances to step S4202. In step S4202, a feature amount pattern including an oldest time is detected and acquired with reference to time feature amount elements used upon generation of the face dictionary. In step S4203, the feature amount pattern acquired in step S4202 is deleted. After deletion, the capacity is confirmed again, and the processing is repetitively executed until the capacity becomes not more than the predetermined value.

In the example shown in FIG. 33, of time feature amount elements, if an element on the left side is older, that is, a black element is oldest, data including a black feature amount element is deleted. That is, in this example, four black feature amount patterns are deleted.

As described above, a face is ever-changing. Since a face dictionary to be referred to for personal recognition processing of a newly input image includes new data, the personal recognition precision can be further improved. That is, by excluding data of older times, the personal recognition precision can be further improved. Note that it is easy for a face dictionary including feature amount elements segmented using time information to implement this processing.

Note that the processing sequence described in FIG. 36 refers to the capacity to judge whether or not to delete older data. In addition, the user may explicitly execute processing for reducing a capacity.

[Other Embodiments]

The aforementioned embodiments are merely means for obtaining the effects of the present invention, and those using similar but different methods or using different parameters are included in the scope of the present invention when they can obtain effects equivalent to those of the present invention.

The aforementioned embodiment has explained an output matter obtained by laying out a plurality of images on one page as a layout output matter. Of course, the present invention is applicable to a plurality of pages to be output.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154011, filed Jul. 9, 2012, which is hereby incorporated by reference herein in its entirety.

What is claimed is:

1. An apparatus comprising:
a management unit that classifies feature patterns for identifying an object, where each pattern includes a plurality of feature amounts corresponding to a plurality of parts of a face region of the object extracted from image data, and that manages the feature patterns using a dictionary;
a dividing unit that divides a feature amount of a target part among the plurality of parts of an object of interest, into a plurality of division feature amounts as a plurality of new feature amounts of the target part; and
a registration unit that registers, in a case where the dividing unit divides the feature amount of the target part into the plurality of new feature amounts, a plurality of new feature patterns for identifying the object of interest, where the plurality of new feature patterns are obtained by combining each of the plurality of new feature amounts of the target part divided by the dividing unit with feature amounts of parts other than the target part, in the dictionary.

2. The apparatus according to claim 1, wherein the dictionary includes not less than two feature patterns for respective objects.

3. The apparatus according to claim 2, further comprising:
a first determination unit that determine whether or not a frequency of occurrence of a feature patterns managed in the dictionary, which is managed by said management unit, in a plurality of image data upon recognition of a face region in image data using the dictionary satisfies a predetermined criterion; and
an excluding unit that excludes a feature pattern which is determined by said first determination unit not to satisfy the predetermined criterion.

4. The apparatus according to claim 1, wherein one of the feature patterns managed in the dictionary includes a feature amount of an accessory in a face region.

5. The apparatus according to claim 1, further comprising:
a second determination unit that determines, in a case where variations of feature patterns of an object managed in the dictionary exceed a pre-set value, whether or not variations of the feature patterns of the object managed in the dictionary and a new feature pattern of the object in the dictionary are smaller than the variations of the feature pattern of the object in the dictionary, wherein in a case where said second determination unit determines that the variations of the feature patterns of the object managed in the dictionary and the new feature pattern are smaller than the variations of the feature patterns of the object managed in the dictionary, said registration unit registers the new feature pattern in the dictionary.

6. The apparatus according to claim 1, further comprising a specifying unit which specifies one or more peaks of the feature amount of the target part of the face region in a frequency distribution,
wherein, in a case where the specifying unit specifies a plurality of peaks of the feature amount of the target part of the face region, the division unit divides the feature amount of the target part into the plurality of division feature amounts as the plurality of new feature amounts of the target part based on the peaks specified by the specifying unit.

7. The apparatus according to claim 6, wherein, in a case where the specifying unit does not specify a plurality of peaks of the feature amount of the target part of the face region in a frequency distribution, the division unit does not divide the feature amount of the target part into the plurality of division feature amounts as the plurality of new feature amounts of the target part.

8. The apparatus according to claim 1, wherein the registration unit re-registers the plurality of new feature patterns by replacing the plurality of the feature pattern having been managed in the dictionary with the plurality of new feature patterns.

9. The apparatus according to claim 1, further comprising a face recognition unit which recognizes a face in an image using the dictionary.

10. The apparatus according to claim 1, wherein the plurality of parts include at least two of an eye, an eyebrow, a mouth, and nose.

11. The apparatus according to claim 1, further comprising a determining unit determining whether the number of peaks of the feature amount of the target part of the face region in a frequency distribution is more than one,
wherein, in a case where the determining unit determines that the number of peaks of the feature amount of the target part of the face region in the frequency distribution is more than one, the dividing unit divides the feature amount of the target part into the plurality of division feature amounts as the plurality of new feature amounts of the target part.

12. The apparatus according to claim 1, wherein the plurality of new feature patterns of the object are obtained by combining a first feature amount, a second feature amount and a third feature amount, each corresponding to a part different from each other of the object of interest.

13. A method of controlling an information processing apparatus managing a plurality of images in which a face is included, comprising the steps of:
classifying, with a classifying unit, feature patterns for identifying an object, where each pattern includes a plurality of feature amounts corresponding to a plurality of parts of a face region of the object extracted from image data, and managing the feature patterns using a dictionary;
dividing, with a dividing unit a feature amount of a target part among the plurality of parts of an object interest into a plurality of division feature amounts as a plurality of new feature amounts of the target part; and
registering, with a registering unit, in a case where the feature amount of the target part is divided into the plurality of new feature amounts, a plurality of new feature patterns for identifying the object of interest, where the plurality of new feature patterns are obtained by combining each of the plurality of new feature amounts of the target part divided in the dividing step with feature amounts of parts other than the target part in the dictionary.

14. The method according to claim 13, wherein the dictionary includes not less than two feature patterns for respective objects.

15. The method according to claim 14, further comprising the step of:
determining whether or not a frequency of occurrence of a managed feature pattern in the dictionary in a plurality of image data upon recognition of a face region in image data using the dictionary satisfies a predetermined criterion,
wherein a feature pattern which is determined not to satisfy the predetermined criterion, is excluded.

16. The method according to claim 13, wherein one of the feature patterns managed in the dictionary includes a feature amount of an accessory in a face region.

17. The method according to claim 13, further comprising:
determining, in a case where variations of feature patterns of an object managed in the dictionary exceed a pre-set value, whether or not variations of the feature patterns of the object managed in the dictionary and a new feature pattern of the object in the dictionary are smaller than the variations of the feature patterns of the object managed in the dictionary,
wherein, in a case where it is determined that the variations of the feature patterns of the object managed in the dictionary and the new feature pattern are smaller than the variations of the feature patterns of the object managed in the dictionary, the new feature pattern is registered in the dictionary.

18. A non-transitory computer-readable storage medium storing a program for controlling a computer to execute respective steps of a method, the method comprising the steps of:
classifying feature patterns for identifying an object, where each pattern includes feature amounts corresponding to a plurality of parts of a face region of the object extracted from image data, and managing the feature patterns using a dictionary;
dividing, a feature amount of a target part among the plurality of parts of an object of interest into a plurality of division feature amounts as a plurality of new feature amounts of the target part; and
registering, in a case where the feature amount of the target part is divided into the plurality of new feature amounts, a plurality of new feature patterns for identifying the object of interest, where the plurality of feature patterns are obtained by combining each of the plurality of new feature amounts of the target part with feature amounts of parts other than the target part in the dictionary.

19. The non-transitory computer-readable storage medium according to claim 18, further comprising a step of specifying one or more peaks of a feature amount of target part of the face region in a frequency distribution,
wherein, in a case where in the specifying step a plurality of peaks of the feature amount of the target part of the face are specified, the dividing step divides the feature amount of the target part into plurality of division feature amounts as the plurality of new feature amounts of the target part based on the specified peaks.

20. The non-transitory computer-readable storage medium according to claim 19, wherein, in a case where in the specifying step a plurality of peaks of the feature amount of the target part of the face are not specified, the dividing step does not divide the feature amount of the target part into the plurality of division feature amounts as the plurality of new feature amounts of the target part.

21. The non-transitory computer-readable storage medium according to claim 18, wherein, in a case where in the dividing step the feature amount of the one part is divided into the plurality of new feature amounts, the registering step re-registers the plurality of new feature patterns by replacing the plurality of the feature patterns having been managed in the dictionary with the plurality of new feature patterns.

22. The non-transitory computer-readable storage medium according to claim 18, further comprising a face recognition step of recognizing a face in an image using the dictionary.

23. The non-transitory computer-readable storage medium according to claim 18, wherein the plurality of parts include at least two of eye, eyebrow, mouth, and nose.

24. The non-transitory computer-readable storage medium according to claim 18, wherein the plurality of new feature patterns of the object are obtained by combining a first feature amount, a second feature amount and a third feature amount, each corresponding to a part different from each other.

* * * * *